(12) United States Patent
Akimoto et al.

(10) Patent No.: US 11,381,331 B2
(45) Date of Patent: Jul. 5, 2022

(54) COMMUNICATION QUALITY DETERIORATION PREDICTION SYSTEM, METHOD, AND PROGRAM

(71) Applicant: NEC Corporation, Tokyo (JP)

(72) Inventors: Ichirou Akimoto, Tokyo (JP); Daisuke Yokoi, Tokyo (JP); Naoki Sawada, Tokyo (JP); Masayuki Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 210 days.

(21) Appl. No.: 16/771,457

(22) PCT Filed: Dec. 11, 2017

(86) PCT No.: PCT/JP2017/044308
§ 371 (c)(1),
(2) Date: Jun. 10, 2020

(87) PCT Pub. No.: WO2019/116417
PCT Pub. Date: Jun. 20, 2019

(65) Prior Publication Data
US 2021/0075528 A1    Mar. 11, 2021

(51) Int. Cl.
*H04B 17/391* (2015.01)
*G06N 20/20* (2019.01)
(Continued)

(52) U.S. Cl.
CPC ......... *H04B 17/3913* (2015.01); *G06N 20/20* (2019.01); *H04B 17/40* (2015.01); *H04L 47/127* (2013.01)

(58) Field of Classification Search
CPC .... H04B 17/3913; H04B 17/40; G06N 20/20; H04L 47/127
See application file for complete search history.

(56) References Cited

U.S. PATENT DOCUMENTS

| 2009/0047943 A1 | 2/2009 | Araki |
| 2017/0026862 A1 | 1/2017 | Li |

(Continued)

FOREIGN PATENT DOCUMENTS

| EP | 2026517 A1 | 2/2009 |
| JP | 2009-049593 A | 3/2009 |

(Continued)

OTHER PUBLICATIONS

International Search Report for PCT Application No. PCT/JP2017/044308, dated Feb. 13, 2018.

(Continued)

*Primary Examiner* — Nguyen T Vo
(74) *Attorney, Agent, or Firm* — Sughrue Mion, PLLC

(57) ABSTRACT

A first prediction unit 83 predicts the amount of future communication quality deterioration or the presence or absence of occurrence of future communication quality deterioration in a communication section between one communication device and another communication device communicably connected to the one communication device by using a first learning model generated on the basis of first attributes being attributes related to a cause of communication quality deterioration in the communication section. A second prediction unit 84 predicts the amount of future communication quality deterioration or the presence or absence of occurrence of future communication quality deterioration outside the communication section regarding one communication device by using a second learning model generated on the basis of second attributes being attributes related to a cause of communication quality deterioration outside the communication section regarding the one communication device.

10 Claims, 20 Drawing Sheets

(51) Int. Cl.
  *H04B 17/40* (2015.01)
  *H04L 47/127* (2022.01)

(56) References Cited

U.S. PATENT DOCUMENTS

| | | | | |
|---|---|---|---|---|
| 2017/0202000 | A1* | 7/2017 | Fu | H04W 72/0413 |
| 2018/0242191 | A1* | 8/2018 | Lundqvist | H04W 72/1236 |
| 2019/0075569 | A1* | 3/2019 | Zhang | H04B 17/391 |
| 2019/0342763 | A1* | 11/2019 | Jung | H04B 17/309 |

FOREIGN PATENT DOCUMENTS

| | | |
|---|---|---|
| JP | 2015-158861 A | 9/2015 |
| JP | 2016-173782 A | 9/2016 |
| JP | 2016-220060 A | 12/2016 |
| JP | 2017-046095 A | 3/2017 |
| WO | 2015/162878 A1 | 10/2015 |

OTHER PUBLICATIONS

Japanese Office Action far JP Application No. 2019-559424 dated Apr. 6, 2021 with English Translation.
Extended European Search Report for EP Application No. EP17934481.7 dated Nov. 23, 2020.
Gitanjali Bhutani: "Application of Machine-Learning Based Prediction Techniques in Wireless Networks", International Journal of Communications,Network and System Sciences, 2014, vol. 07, No. 05, May 2014, pp. 131-140, XP055381211, US ISSN: 1913-3715, DOI:10.4236/ijcns.2014.75015.

* cited by examiner

FIG. 3

INFORMATION OF RADIO RELAY DEVICE 51a

| TIME | WEATHER INFORMATION | | ... | ANTENNA ORIENTATION | | ANTENNA SIZE | ANTENNA TYPE | FREQUENCY | RADIO WAVE CONDITIONS |
|---|---|---|---|---|---|---|---|---|---|
| | TYPE | TEMPERATURE | | ELEVATION | AZIMUTH | | | | |
| .. | .. | .. | ... | .. | .. | .. | .. | .. | .. |
| 2017/10/10 15:00 | SUNNY | 23 | ... | 0.000 | 45.000 | 60 | 1 | 12345 | INTERFERENCE |
| 2017/10/10 16:00 | SUNNY | 23 | ... | 0.000 | 45.000 | 60 | 1 | 12345 | INTERFERENCE |
| .. | .. | .. | ... | .. | .. | .. | .. | .. | .. |
| 2017/10/11 15:00 | RAINY | 18 | ... | 0.001 | 45.001 | 60 | 1 | 12345 | NO INTERFERENCE |
| .. | .. | .. | ... | .. | .. | .. | .. | .. | .. |

FIG. 4

| TIME | PROFESSIONAL BASEBALL GAME | GAME OF SOCCER WORLD CUP | TYPHOON | EARTHQUAKE |
|---|---|---|---|---|
| ⋮ | ⋮ | ⋮ | ⋮ | ⋮ |
| 2017/10/10 15:00 | YES | NO | YES | NO |
| 2017/10/10 16:00 | YES | NO | YES | NO |
| ⋮ | ⋮ | ⋮ | ⋮ | ⋮ |
| 2017/10/11 15:00 | YES | NO | NO | NO |
| ⋮ | ⋮ | ⋮ | ⋮ | ⋮ |

FIG. 5

| DATE | CAMPAIGN |
|---|---|
| ⋮ | ⋮ |
| 2017/10/10 | YES |
| 2017/10/11 | NO |
| ⋮ | ⋮ |

FIG. 6

TRAINING DATA FOR GENERATION OF FIRST LEARNING MODEL, GENERATED REGARDING RADIO RELAY DEVICE 51a

| TIME | WEATHER INFORMATION | | | ANTENNA ORIENTATION | | ANTENNA SIZE | ANTENNA TYPE | FREQUENCY | RADIO WAVE CONDITIONS | AMOUNT OF PACKET LOSS AFTER LAPSE OF PREDETERMINED PERIOD |
|---|---|---|---|---|---|---|---|---|---|---|
| | TYPE | TEMPERATURE | ... | ELEVATION | AZIMUTH | | | | | |
| ... | ... | ... | ... | ... | ... | ... | ... | ... | ... | ... |
| 2017/10/10 15:00 | 0.0 | 23 | ... | 0.000 | 45.000 | 60 | 1 | 12345 | 1 | 0 |
| 2017/10/10 16:00 | 0.0 | 23 | ... | 0.000 | 45.000 | 60 | 1 | 12345 | 1 | 0 |
| ... | ... | ... | ... | ... | ... | ... | ... | ... | ... | ... |
| 2017/10/11 15:00 | 1.0 | 18 | ... | 0.001 | 45.001 | 60 | 1 | 12345 | 0 | 60000 |
| ... | ... | ... | ... | ... | ... | ... | ... | ... | ... | ... |

FIG. 7

TRAINING DATA FOR GENERATION OF FIRST LEARNING MODEL, GENERATED REGARDING RADIO RELAY DEVICE 51a

| TIME | WEATHER INFORMATION | | | ANTENNA ORIENTATION | | ANTENNA SIZE | ANTENNA TYPE | FREQUENCY | RADIO WAVE CONDITIONS | PRESENCE OR ABSENCE OF OCCURRENCE OF PACKET LOSS AFTER LAPSE OF PREDETERMINED PERIOD |
|---|---|---|---|---|---|---|---|---|---|---|
| | TYPE | TEMPERATURE | ... | ELEVATION | AZIMUTH | | | | | |
| ... | ... | ... | ... | ... | ... | ... | ... | ... | ... | ... |
| 2017/10/10 15:00 | 0.0 | 23 | ... | 0.000 | 45.000 | 60 | 1 | 12345 | 1 | 0 |
| 2017/10/10 16:00 | 0.0 | 23 | ... | 0.000 | 45.000 | 60 | 1 | 12345 | 1 | 0 |
| ... | ... | ... | ... | ... | ... | ... | ... | ... | ... | ... |
| 2017/10/11 15:00 | 1.0 | 18 | ... | 0.001 | 45.001 | 60 | 1 | 12345 | 0 | 1 |
| ... | ... | ... | ... | ... | ... | ... | ... | ... | ... | ... |

FIG. 8

TRAINING DATA FOR GENERATION OF SECOND LEARNING MODEL, GENERATED REGARDING RADIO RELAY DEVICE 51a

| TIME | NUMBER OF BASE STATIONS | PRESENCE OR ABSENCE OF PROFESSIONAL BASEBALL GAMES | ... | PRESENCE OR ABSENCE OF TYPHOON | PRESENCE OR ABSENCE OF EARTHQUAKE | PRESENCE OR ABSENCE OF CAMPAIGN | DEMOGRAPHICS | AMOUNT OF PACKET LOSS AFTER LAPSE OF PREDETERMINED PERIOD |
|---|---|---|---|---|---|---|---|---|
| ... | ... | ... | ... | ... | ... | ... | ... | ... |
| 2017/10/10 15:00 | 1 | 1 | ... | 1 | 0 | 1 | +10000 | 70000 |
| 2017/10/10 16:00 | 1 | 1 | ... | 1 | 0 | 1 | +10000 | 70000 |
| ... | ... | ... | ... | ... | ... | ... | ... | ... |
| 2017/10/11 15:00 | 1 | 1 | ... | 0 | 0 | 0 | +10000 | 0 |
| ... | ... | ... | ... | ... | ... | ... | ... | ... |

FIG. 9

TRAINING DATA FOR GENERATION OF SECOND LEARNING MODEL, GENERATED REGARDING RADIO RELAY DEVICE 51a

| TIME | NUMBER OF BASE STATIONS | PRESENCE OR ABSENCE OF PROFESSIONAL BASEBALL GAMES | ... | PRESENCE OR ABSENCE OF TYPHOON | PRESENCE OR ABSENCE OF EARTHQUAKE | PRESENCE OR ABSENCE OF CAMPAIGN | DEMOGRAPHICS | PRESENCE OR ABSENCE OF OCCURRENCE OF PACKET LOSS AFTER LAPSE OF PREDETERMINED PERIOD |
|---|---|---|---|---|---|---|---|---|
| ... | ... | ... | ... | ... | ... | ... | ... | ... |
| 2017/10/10 15:00 | 1 | 1 | ... | 1 | 0 | 1 | +10000 | 1 |
| 2017/10/10 16:00 | 1 | 1 | ... | 1 | 0 | 1 | +10000 | 1 |
| ... | ... | ... | ... | ... | ... | ... | ... | ... |
| 2017/10/11 15:00 | 1 | 1 | ... | 0 | 0 | 0 | +10000 | 0 |
| ... | ... | ... | ... | ... | ... | ... | ... | ... |

FIG. 14

TRAINING DATA FOR GENERATION OF FIRST LEARNING MODEL, GENERATED REGARDING RADIO RELAY DEVICE 51a

| TIME | WEATHER INFORMATION | | | ANTENNA ORIENTATION | | | RADIO WAVE CONDITIONS | TRAFFIC AMOUNT AFTER LAPSE OF PREDETERMINED PERIOD | AMOUNT OF PACKET LOSS AFTER LAPSE OF PREDETERMINED PERIOD |
|---|---|---|---|---|---|---|---|---|---|
| | TYPE | TEMPERATURE | ... | ELEVATION | AZIMUTH | ... | | | |
| ... | ... | ... | ... | ... | ... | ... | ... | ... | ... |
| 2017/10/10 15:00 | 0.0 | 23 | ... | 0.000 | 45.000 | ... | 1 | 110000 | 0 |
| 2017/10/10 16:00 | 0.0 | 23 | ... | 0.000 | 45.000 | ... | 1 | 110000 | 0 |
| ... | ... | ... | ... | ... | ... | ... | ... | ... | ... |
| 2017/10/11 15:00 | 1.0 | 18 | ... | 0.001 | 45.001 | ... | 0 | 170000 | 60000 |
| ... | ... | ... | ... | ... | ... | ... | ... | ... | ... |

FIG. 15

TRAINING DATA FOR GENERATION OF FIRST LEARNING MODEL, GENERATED REGARDING RADIO RELAY DEVICE 51a

| TIME | WEATHER INFORMATION | | ... | ANTENNA ORIENTATION | | ... | RADIO WAVE CONDITIONS | TRAFFIC AMOUNT AFTER LAPSE OF PREDETERMINED PERIOD | PRESENCE OR ABSENCE OF OCCURRENCE OF PACKET LOSS AFTER LAPSE OF PREDETERMINED PERIOD |
|---|---|---|---|---|---|---|---|---|---|
| | TYPE | TEMPERATURE | | ELEVATION | AZIMUTH | | | | |
| ... | ... | ... | ... | ... | ... | ... | ... | ... | ... |
| 2017/10/10 15:00 | 0.0 | 23 | ... | 0.000 | 45.000 | ... | 1 | 110000 | 0 |
| 2017/10/10 16:00 | 0.0 | 23 | ... | 0.000 | 45.000 | ... | 1 | 110000 | 0 |
| ... | ... | ... | ... | ... | ... | ... | ... | ... | ... |
| 2017/10/11 15:00 | 1.0 | 18 | ... | 0.001 | 45.001 | ... | 0 | 170000 | 1 |
| ... | ... | ... | ... | ... | ... | ... | ... | ... | ... |

FIG. 16

TRAINING DATA FOR GENERATION OF SECOND LEARNING MODEL, GENERATED REGARDING RADIO RELAY DEVICE 51a

| TIME | NUMBER OF BASE STATIONS | PRESENCE OR ABSENCE OF PROFESSIONAL BASEBALL GAMES | ... | PRESENCE OR ABSENCE OF TYPHOON | PRESENCE OR ABSENCE OF EARTHQUAKE | PRESENCE OR ABSENCE OF CAMPAIGN | DEMOGRAPHICS | TRAFFIC AMOUNT AFTER LAPSE OF PREDETERMINED PERIOD | AMOUNT OF PACKET LOSS AFTER LAPSE OF PREDETERMINED PERIOD |
|---|---|---|---|---|---|---|---|---|---|
| .. | .. | .. | .. | .. | .. | .. | .. | .. | .. |
| 2017/10/10 15:00 | 1 | 1 | ... | 1 | 0 | 1 | +10000 | 110000 | 70000 |
| 2017/10/10 16:00 | 1 | 1 | ... | 1 | 0 | 1 | +10000 | 110000 | 70000 |
| .. | .. | .. | .. | .. | .. | .. | .. | .. | .. |
| 2017/10/11 15:00 | 1 | 1 | ... | 0 | 0 | 0 | +10000 | 170000 | 0 |
| .. | .. | .. | .. | .. | .. | .. | .. | .. | .. |

FIG. 17

TRAINING DATA FOR GENERATION OF SECOND LEARNING MODEL, GENERATED REGARDING RADIO RELAY DEVICE 51a

| TIME | NUMBER OF BASE STATIONS | PRESENCE OR ABSENCE OF PROFESSIONAL BASEBALL GAMES | ... | PRESENCE OR ABSENCE OF TYPHOON | PRESENCE OR ABSENCE OF EARTHQUAKE | PRESENCE OR ABSENCE OF CAMPAIGN | DEMOGRAPHICS | TRAFFIC AMOUNT AFTER LAPSE OF PREDETERMINED PERIOD | PRESENCE OR ABSENCE OF OCCURRENCE OF PACKET LOSS AFTER LAPSE OF PREDETERMINED PERIOD |
|---|---|---|---|---|---|---|---|---|---|
| .. | .. | .. | .. | .. | .. | .. | .. | .. | .. |
| 2017/10/10 15:00 | 1 | 1 | ... | 1 | 0 | 1 | +10000 | 110000 | 0 |
| 2017/10/10 16:00 | 1 | 1 | ... | 1 | 0 | 1 | +10000 | 110000 | 0 |
| .. | .. | .. | .. | .. | .. | .. | .. | .. | .. |
| 2017/10/11 15:00 | 1 | 1 | ... | 0 | 0 | 0 | +10000 | 170000 | 1 |
| .. | .. | .. | .. | .. | .. | .. | .. | .. | .. |

FIG. 18

TRAINING DATA FOR GENERATION OF THIRD LEARNING MODEL, GENERATED REGARDING RADIO RELAY DEVICE 51a

| TIME | WEATHER INFORMATION | | | PRESENCE OR ABSENCE OF PROFESSIONAL BASEBALL GAMES | ... | TRAFFIC AMOUNT | TRAFFIC AMOUNT AFTER LAPSE OF PREDETERMINED PERIOD |
|---|---|---|---|---|---|---|---|
| | TYPE | TEMPERATURE | ... | | | | |
| .. | .. | .. | .. | .. | .. | .. | .. |
| 2017/10/10 15:00 | 0.0 | 23 | ... | 1 | ... | 120000 | 110000 |
| 2017/10/10 16:00 | 0.0 | 23 | ... | 1 | ... | 120000 | 110000 |
| .. | .. | .. | .. | .. | .. | .. | .. |
| 2017/10/11 15:00 | 1.0 | 18 | ... | 1 | ... | 130000 | 170000 |
| .. | .. | .. | .. | .. | .. | .. | .. |

COMMUNICATION QUALITY DETERIORATION PREDICTION SYSTEM, METHOD, AND PROGRAM

This application is a National Stage Entry of PCT/JP2017/044308 filed on Dec. 11, 2017, the contents of all of which are incorporated herein by reference, in their entirety.

TECHNICAL FIELD

The present invention relates to a communication quality deterioration prediction system, a communication quality deterioration prediction method, and a communication quality deterioration prediction program for predicting the amount of future communication quality deterioration or the presence or absence of occurrence of future communication quality deterioration.

BACKGROUND ART

PTL 1 discloses a system including a learning device that generates a learning model for predicting a malfunction of a monitored device and including a malfunction prediction device that receives a learning model from the learning device and predicts occurrence of a malfunction of the monitored device using the learning model.

CITATION LIST

Patent Literature

PTL 1: Japanese Patent Application Laid-Open No. 2016-173782

SUMMARY OF INVENTION

Technical Problem

According to the invention described in PTL 1, it is possible to predict occurrence of a malfunction in a monitored device. However, when a communication device is to be monitored, it is preferable to be able to make predictions regarding communication quality deterioration, which is a sign of a malfunction, rather than predicting the occurrence of the malfunction. This is because, by making a prediction regarding communication quality deterioration, which is a sign of a malfunction, it is possible to more quickly deal with the communication device to be monitored.

In addition, in the case of predicting the amount of future communication quality deterioration or the presence or absence of occurrence of future communication quality deterioration, it is preferable to achieve high prediction accuracy.

In view of these, the present invention aims to provide a communication quality deterioration prediction system, a communication quality deterioration prediction method, and a communication quality deterioration prediction program capable of predicting with high accuracy the amount of future communication quality deterioration or the presence or absence of occurrence of future communication quality deterioration.

Solution to Problem

A communication quality deterioration prediction system according to the present invention includes: a first prediction unit that predicts the amount of future communication quality deterioration or the presence or absence of occurrence of future communication quality deterioration in a communication section between one communication device and another communication device communicably connected to the one communication device by using a first learning model generated on the basis of first attributes being attributes related to a cause of communication quality deterioration in the communication section; a second prediction unit that predicts the amount of future communication quality deterioration or the presence or absence of occurrence of future communication quality deterioration outside the communication section regarding the one communication device by using a second learning model generated on the basis of second attributes being attributes related to a cause of communication quality deterioration outside the communication section regarding the one communication device; and a determination unit that determines the amount of future communication quality deterioration or the presence or absence of occurrence of future communication quality deterioration regarding the one communication device on the basis of a prediction result of the first prediction unit and a prediction result of the second prediction unit.

Furthermore, a communication quality deterioration prediction method according to the present invention includes: executing a first prediction process of predicting the amount of future communication quality deterioration or the presence or absence of occurrence of future communication quality deterioration in a communication section between one communication device and another communication device communicably connected to the one communication device by using a first learning model generated on the basis of first attributes being attributes related to a cause of communication quality deterioration in the communication section; executing a second prediction process of predicting the amount of future communication quality deterioration or the presence or absence of occurrence of future communication quality deterioration outside the communication section regarding the one communication device by using a second learning model generated on the basis of second attributes being attributes related to a cause of communication quality deterioration outside the communication section regarding the one communication device; and determining the amount of future communication quality deterioration or the presence or absence of occurrence of future communication quality deterioration regarding the one communication device on the basis of a prediction result of the first prediction process and a prediction result of the second prediction process.

Furthermore, a communication quality deterioration prediction program according to the present invention is provided for causing a computer to execute processes including: a first prediction process of predicting the amount of future communication quality deterioration or the presence or absence of occurrence of future communication quality deterioration in a communication section between one communication device and another communication device communicably connected to the one communication device by using a first learning model generated on the basis of first attributes being attributes related to a cause of communication quality deterioration in the communication section; a second prediction process of predicting the amount of future communication quality deterioration or the presence or absence of occurrence of future communication quality deterioration outside the communication section regarding the one communication device by using a second learning model generated on the basis of second attributes being attributes related to a cause of communication quality deterioration outside the communication section regarding the one communication device; and a determination process of determining the amount of future communication quality deterioration or the presence or absence of occurrence of future communication quality deterioration regarding the one communication device on the basis of a prediction result of the first prediction process and a prediction result of the second prediction process.

Advantageous Effects of Invention

According to the present invention, it is possible to predict with high accuracy the amount of future communication quality deterioration or the presence or absence of occurrence of future communication quality deterioration.

BRIEF DESCRIPTION OF DRAWINGS

FIG. 3 It depicts a schematic diagram illustrating an example of radio relay device information stored per unit time.

FIG. 4 It depicts a schematic diagram illustrating an example of event information.

FIG. 5 It depicts a schematic diagram illustrating an example of campaign information.

FIG. 6 It depicts a schematic diagram illustrating an example of training data including values of first attributes.

FIG. 7 It depicts a schematic diagram illustrating another example of training data including values of the first attributes.

FIG. 8 It depicts a schematic diagram illustrating an example of training data including values of second attributes.

FIG. 9 It depicts a schematic diagram illustrating another example of training data including values of the second attributes.

FIG. 10 It depicts a schematic diagram illustrating an example of integrating prediction results in a radio relay device 51a.

FIG. 11 It depicts a schematic diagram illustrating another example of integrating prediction results in the radio relay device 51a.

FIG. 14 It depicts a schematic diagram illustrating an example of training data including values of first attributes in the second exemplary embodiment.

FIG. 15 It depicts a schematic diagram illustrating another example of the training data including the values of the first attributes in the second exemplary embodiment.

FIG. 16 It depicts a schematic diagram illustrating an example of training data including values of second attributes in the second exemplary embodiment.

FIG. 17 It depicts a schematic diagram illustrating another example of training data including values of the second attributes in the second exemplary embodiment.

FIG. 18 It depicts a schematic diagram illustrating an example of training data used to generate a third learning model.

DESCRIPTION OF EMBODIMENTS

Hereinafter, exemplary embodiments of the present invention will be described with reference to the drawings.

A communication quality deterioration prediction system according to the present invention makes a prediction regarding communication quality deterioration in a communication device. In the exemplary embodiments described below, a case will be described as an example where a communication device as a prediction target is a radio relay device. However, the communication device as a prediction target is not limited to the radio relay device, and may be a base station or an optical communication device that performs optical communication.

Figure 1:
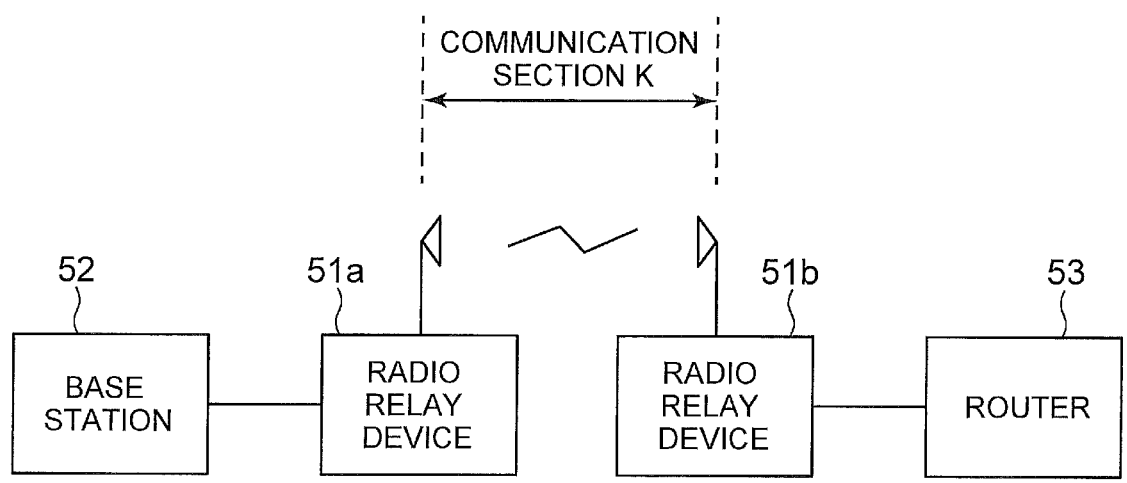
FIG. 1 It depicts a schematic diagram illustrating a radio relay device.

FIG. 1 is a schematic diagram illustrating a radio relay device. Communication devices are typically provided as paired devices. In the example illustrated in FIG. 1, a radio relay device 51a and a radio relay device 51b are provided as paired devices, and radio communication is implemented between the radio relay device 51a and the radio relay device 51b. FIG. 1 illustrates a case where one radio relay device 51a is connected to the base station 52 while the other radio relay device 51b is connected to a router 53. Note that each of the radio relay devices 51a and 51b will be simply referred to as the "radio relay device 51" in a case where the two devices are not particularly distinguished from each other. Note that "the radio relay device 51a and the radio relay device 51b are provided as paired devices" may be expressed as "the radio relay device 51a and the radio relay device 51b are communicably connected to each other".

In each of the exemplary embodiments described below, a communication section between the paired radio relay devices 51a and 51b is referred to as a communication section K.

The communication quality deterioration prediction system of the present invention generates, for each of the radio relay devices 51, a learning model focused on the communication section K and a learning model focused on the outside of the communication section K, as a learning model for predicting future communication quality deterioration. As will be described below, the former learning model is referred to as a first learning model, and the latter learning model is referred to as a second learning model. The communication quality deterioration prediction system makes a prediction regarding communication quality deterioration using these learning models.

For example, in a case where the radio relay device 51a is defined as a prediction target, the communication section on the base station 52 side is defined as the outside of the "communication section K" when viewed from the radio relay device 51a. Furthermore, for example, in a case where the radio relay device 51b is defined as a prediction target, the communication section on the router 53 side is defined outside the "communication section K" when viewed from the radio relay device 51b.

Furthermore, although the exemplary embodiments described below is an exemplary case where communication quality is represented by packet loss, the communication quality may be represented by an index other than packet loss. In a case where the communication quality is represented by packet loss, the amount of packet loss corresponds to the amount of communication quality deterioration.

First Exemplary Embodiment

Figure 2:
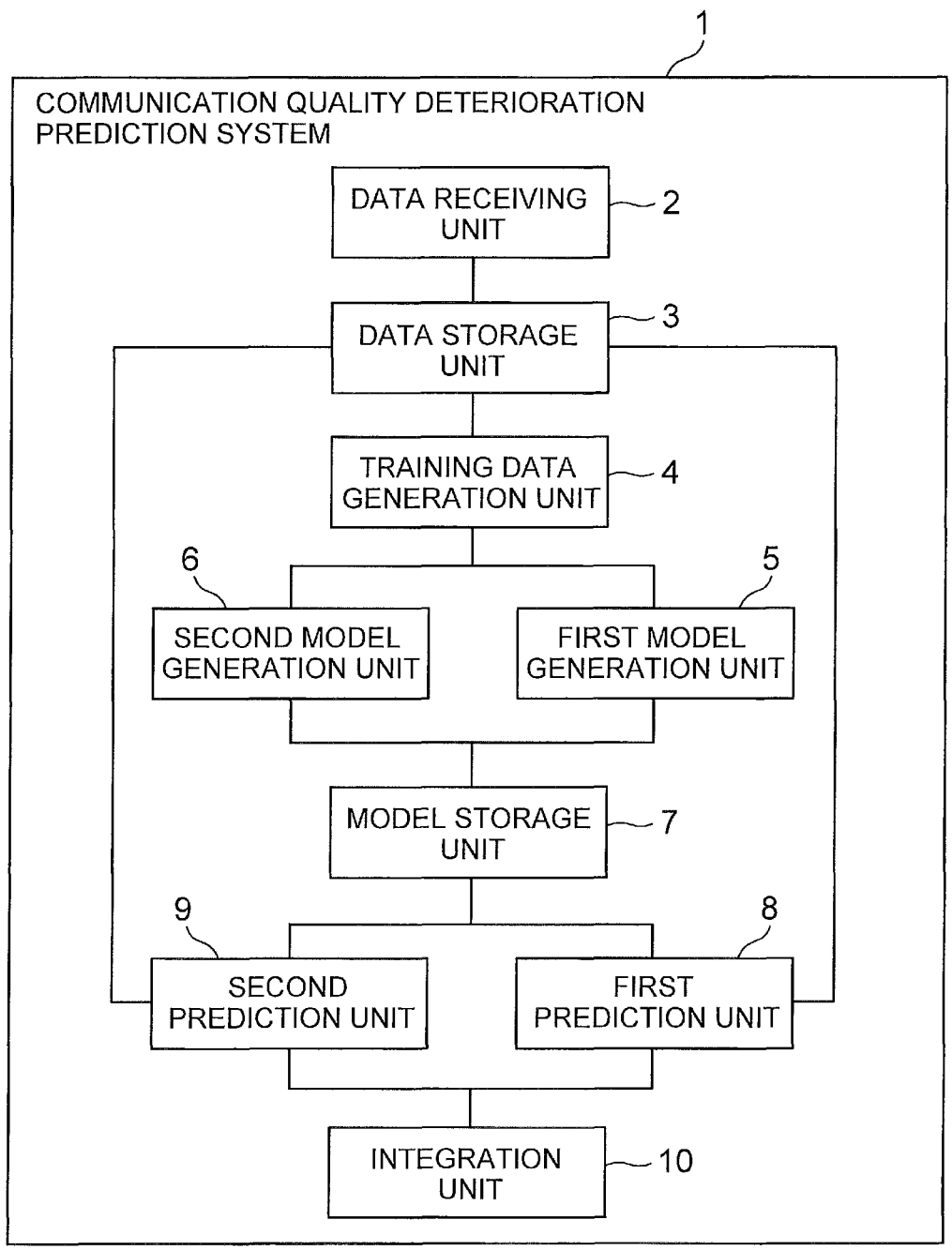
FIG. 2 It depicts a block diagram illustrating an example of a communication quality deterioration prediction system according to a first exemplary embodiment of the present invention.

FIG. 2 is a block diagram illustrating an example of a communication quality deterioration prediction system according to a first exemplary embodiment of the present invention. A communication quality deterioration prediction system 1 of the present invention includes a data receiving unit 2, a data storage unit 3, a training data generation unit 4, a first model generation unit 5, a second model generation unit 6, a model storage unit 7, a first prediction unit 8, a second prediction unit 9, and an integration unit 10.

The data storage unit 3 is a storage device that stores information to be included in training data used for generating a learning model and information used to derive training data.

Hereinafter, various types of information stored in the data storage unit 3 will be described.

The data storage unit 3 stores information regarding each of the radio relay devices 51.

The information regarding each of the radio relay devices 51 includes information regarding weather at a location where the radio relay device 51 is disposed. The weather information includes, for example, information indicating a type such as "sunny", "cloudy" or "rainy", as well as precipitation, temperature, humidity, or the like. These pieces of information are examples, and the information regarding each of the radio relay devices 51 need not include all of the exemplified weather information. Furthermore, other information as weather information may be included in the information regarding each of the radio relay devices 51.

Furthermore, the information regarding each of the radio relay devices 51 includes information regarding orientation of the antenna of the radio relay device 51 and the frequency used for radio communication. The orientation of the antenna may be represented by the elevation and azimuth of the antenna, for example. Hereinafter, a case where the orientation of the antenna is represented by elevation and azimuth will be described as an example.

Furthermore, the information regarding each of the radio relay devices 51 includes information indicating radio wave conditions around the radio relay device 51. The information indicating the radio wave condition is information indicating whether the radio wave condition is good (for example, whether radio wave interference exists).

The information regarding each of the radio relay devices 51 also includes the amount of traffic in transmission and reception performed by the radio relay device 51 or the amount of traffic discarded at the time of reception. Here, each of exemplary embodiments is described focusing on the traffic flow from the base station to the router in the example illustrated in FIG. 1. In this case, the information regarding the radio relay device 51a includes the amount of traffic discarded in the reception of the traffic on the radio relay device 51a from the base station, the amount of traffic transmitted by the radio relay device 51a to the radio relay device 51b, or the like. The information regarding the radio relay device 51b includes the amount of traffic received by the radio relay device 51b from the radio relay device 51a and the amount of traffic transmitted by the radio relay device 51b to the router 53. In this example, the data storage unit 3 also stores the amount of traffic received by the router 53 from the radio relay device 51b. The amount of packet loss is derived from the amount of traffic.

The information regarding the weather, the antenna orientation, the information regarding the frequency used for radio communication, the information indicating radio wave conditions, and the information regarding the amount of traffic might change with time. It is sufficient as long as the information regarding each of the radio relay devices 51 that can be changed in this manner is transmitted from each of the individual radio relay device 51 to the communication quality deterioration prediction system 1 per unit time, and then the data receiving unit 2 receives the information so as to be stored in the data storage unit 3. Furthermore, it is also preferable that the amount of traffic received by the router 53 from the radio relay device 51b is transmitted from the router 53 to the communication quality deterioration prediction system 1 per unit time, and the data receiving unit 2 receives the information so as to be stored in the data storage unit 3. In this case, it is sufficient as long as each of the radio relay devices 51 includes a device for measuring weather information and a device for determining whether the radio wave condition is good. In a case where each of the radio relay devices 51 includes no device for measuring weather information, it is sufficient to configure to provide a device for measuring weather information near each of the radio relay devices 51, and allow the device to transmit the weather information to the communication quality deterioration prediction system 1 per unit time, and allow the data receiving unit 2 to receive the information and store the information in the data storage unit 3.

Each of exemplary embodiments described assumes an exemplary case where the unit time is one hour. In a case where a time is illustrated in the following description and drawings, the notation of the time represents a period of a unit time (one hour) up to the time. For example, in the case where the notation is "15:00 on Oct. 10, 2017", the notation represents a period of one hour from 14:00 on Oct. 10, 2017 to 15:00 on Oct. 10, 2017.

The information regarding each of the radio relay devices 51 includes the position, model, and configuration of the radio relay device 51. Information including these positions, models, configurations, or the like will be referred to as inventory information. In each of exemplary embodiments, the inventory information also includes the size and type of the antenna of the radio relay device 51. The data storage unit 3 stores inventory information for each of the radio relay devices 51. For example, an administrator of the communication network or an administrator of the communication quality deterioration prediction system 1 preliminarily stores inventory information for each of the radio relay devices 51 in the data storage unit 3.

In a case where the data receiving unit 2 stores the information regarding the individual radio relay devices 51 received per unit time in the data storage unit 3, the data receiving unit 2 also stores the size and type of the antenna included in the inventory information in association with the information received. FIG. 3 is a schematic diagram illustrating an example of information regarding the radio relay device 51 stored per unit time in this manner. Although FIG. 3 illustrates an example of the information regarding the radio relay device 51a, the data receiving unit 2 similarly allows the radio relay device 51 to store the information regarding the other radio relay device 51 in the data storage unit 3. In FIG. 3, illustration of information regarding the amount of traffic is omitted. In the example illustrated in FIG. 3, the types of antennas are distinguished by numerical values.

Furthermore, the data storage unit 3 stores event information indicating the presence or absence of various events. The data storage unit 3 stores the presence or absence of various events per unit period (every hour in this example). FIG. 4 is a schematic diagram illustrating an example of event information. As illustrated in FIG. 4, various disasters such as typhoons and earthquakes may be used as events. In FIG. 4, "events of professional baseball", "game of soccer world cup", "typhoon", and "earthquake" are illustrated as the events, although definition of events is not particularly limited.

Furthermore, the data storage unit 3 stores campaign information indicating the presence or absence of a campaign. The data storage unit 3 stores the presence or absence of various campaigns per day. FIG. 5 is a schematic diagram illustrating an example of campaign information. An example of a campaign includes an advertising activity for promoting sales of a communication terminal being a traffic source or destination, although the campaign is not limited to this example.

Furthermore, the data storage unit 3 stores topology information indicating association between nodes forming a network. More specifically, the topology information indicates a connection relationship between the nodes and a direction of a traffic flow between the connected nodes. The topology information enables judgment of the number of base stations connected to the radio relay device 51a. Furthermore, the topology information may be defined so as to be able to specify the number of networks connected to the router 53 to which the radio relay device 51b transmits traffic.

The data storage unit 3 stores calendar information. The calendar information is information indicating the day of the week of each of dates, the day of the week corresponding to a holiday, the date corresponding to a national holiday, and the date of an event (for example, a day of an annual event such as Christmas or Halloween). The calendar information can be used to judge whether the date is a holiday or a weekday. Furthermore, the calendar information enables judgment as to whether the date falls on a holiday or on an annual event day.

In addition, the data storage unit 3 stores, for each of the radio relay devices 51, information indicating demographics in a district in which the radio relay device 51 exists. The information indicating demographics is information indicating the population increase or decrease after a certain period (for example, one year) from each of the dates. In a case where urban planning is defined, it is allowable to use the urban planning as information indicating demographics. Urban planning can be defined as one mode of information indicating demographics.

For example, an administrator of the communication network, or an administrator of the communication quality deterioration prediction system 1 preliminarily stores, in the data storage unit 3, event information, campaign information, topology information, calendar information, and information indicating demographics.

On the basis of the data stored in the data storage unit 3, the training data generation unit 4 generates training data used for generating a learning model. The communication quality deterioration prediction system 1 of the present exemplary embodiment generates, for each of the radio relay devices 51, a learning model focused on the communication section K and a learning model focused on the outside of the communication section K, as a learning model for predicting future packet loss. The former learning model is referred to as a first learning model. The latter learning model is referred to as a second learning model. As described above, in a case where the radio relay device 51a illustrated in FIG. 1 is defined as a prediction target, the communication section on the base station 52 side is defined as the outside of the "communication section K" when viewed from the radio relay device 51a. Furthermore, for example, in a case where the radio relay device 51b is defined as a prediction target, the communication section on the router 53 side is defined outside the "communication section K" when viewed from the radio relay device 51b.

The first learning model and the second learning model are generated for each of the radio relay devices 51. Accordingly, the training data generation unit 4 generates, for each of the radio relay devices 51, training data used for generating the first learning model and training data used for generating the second learning model. Here, an exemplary case of generating training data of the radio relay device 51a illustrated in FIG. 1 will be mainly described. Moreover, as described above, this case is assumed to focus on the traffic flow from the base station to the router in the example illustrated in FIG. 1.

First, operation of generating training data used for generating the first learning model will be described.

Examples of attributes related to the cause of packet loss in the communication section K (refer to FIG. 1) between the paired radio relay device 51a and the radio relay device 51b include weather information, antenna orientation (elevation and azimuth), antenna size, antenna type, frequency, radio wave conditions, or the like (that is individual attributes illustrated in FIG. 3). Hereinafter, an attribute related to the cause of the packet loss in the communication section K is referred to as a first attribute. The cause of the packet loss in the communication section K is referred to as an internal cause. In each of exemplary embodiments of the present invention, the first attributes include at least one attribute out of weather information, antenna orientation, antenna size, antenna type, frequency, and radio wave conditions, for example. Note that an attribute other than the above-described attributes may be used as the first attribute.

The training data generation unit 4 digitizes information represented in a character string among the values of the first attribute of the radio relay device 51a per unit time. For example, among the individual first attributes illustrated in FIG. 3 (weather type, temperature, antenna elevation and azimuth, antenna size, antenna type, frequency and radio wave condition), the weather type and the radio wave condition are represented in a character string. The training data generation unit 4 digitizes this character string. For example, the training data generation unit 4 converts character strings such as "sunny", "cloudy", and "rainy" regarding the attribute of the weather type into "0.0", "0.5", "1.0" or other numerical value, respectively. Furthermore, for example, regarding the attribute "electric field state", the training data generation unit 4 replaces "presence of interference" with "1" and replaces "absence of interference" with "0".

The training data generation unit 4 calculates the amount of packet loss at a unit time after the lapse of a predetermined period (for example, after lapse of 20 days) from the unit time at which the values of the first attributes were obtained, and associates the result of calculation with the time at which the first attribute values were obtained. For example, the training data generation unit 4 calculates the amount of packet loss at "15:00 on Oct. 30, 2017" to be used as the amount of packet loss to be associated with the value of each of the first attribute values at "15:00 on Oct. 10, 2017" illustrated in FIG. 3. This amount of packet loss is the amount of packet loss in the communication section K. The amount of packet loss in the communication section K is obtained by subtracting the amount of traffic (Rx) received from the radio relay device 51a by the radio relay device 51b, from the amount of traffic (Tx) transmitted by the radio relay device 51a toward the radio relay device 51b. For example, the amount of packet loss at "15:00 on Oct. 30, 2017" is obtained by subtracting Rx at "15:00 on Oct. 30, 2017" from Tx at "15:00 on Oct. 30, 2017". The training data generation unit 4 associates the amount of packet loss of "15:00 on Oct. 30, 2017" obtained by calculation with individual values of the first attributes of "15:00 on Oct. 10, 2017" illustrated in FIG. 3. The training data generation unit 4 performs similar processing for each of times illustrated in FIG. 3. In this manner, the training data generation unit 4 generates training data including the values of the first attributes. FIG. 6 illustrates an example of the training data. However, the training data does not need to include all the attributes illustrated in FIG. 6 as the first attribute, and may include other attributes as the first attribute. Furthermore, the training data may include an attribute other than the first attribute (the attribute related to the cause of the packet loss in the communication section K). However, the training data does not include a second attribute described below.

Furthermore, the example illustrated in FIG. 6 is the case where the "amount of packet loss" after the lapse of the predetermined period is included in the training data. The training data generation unit 4 may include "the presence or absence of occurrence of packet loss" after the lapse of a predetermined period, instead of "the amount of packet loss" after the lapse of a predetermined period. The value can be represented by a numerical value "1" for the case of the presence of occurrence of a packet loss, and the value can be represented by a numerical value "0" for the case of the absence of occurrence of a packet loss. For example, the training data generation unit 4 can determine that a packet loss has occurred when Tx−Rx>0, and can determine that no packet loss has occurred when Tx−Rx=0. FIG. 7 illustrates an example of training data including the presence or absence of occurrence of a packet loss after the lapse of a predetermined period.

Next, operation of generating training data used for generating the second learning model will be described.

In a case where the radio relay device 51a illustrated in FIG. 1 is set as a prediction target, the communication section on the base station 52 side will be set as the outside the "communication section K" when viewed from the radio relay device 51a. Examples of attributes related to the cause of the packet loss outside the communication section K include the number of base stations that transmits traffic to the radio relay device 51a, the presence or absence of various events, the presence or absence of a campaign, and demographics of the district in which the radio relay device 51a exists. Hereinafter, an attribute related to the cause of the packet loss outside the communication section K is referred to as a second attribute. The cause of packet loss outside the communication section K is referred to as an external cause. In each of exemplary embodiments of the present invention, the second attributes include at least one attribute out of the presence or absence of an event, the presence or absence of a campaign, and the demographics of the district in which the radio relay device exists. However, an attribute other than the above-described attributes may be used as the second attribute.

The training data generation unit 4 associates, per unit time, the number of base stations that transmits traffic to the radio relay device 51a, the presence or absence of various events, the presence or absence of a campaign, and the demographics of the district in which the radio relay device 51a exists. At this time, the training data generation unit 4 digitizes information represented by a character string. For example, information "present" included in event information (refer to FIG. 4) and campaign information (refer to FIG. 5) is represented by a numerical value "1", and information "absent" is represented by a numerical value "0".

Furthermore, it is sufficient to allow the training data generation unit 4 to derive the number of base stations that transmits traffic to the radio relay device 51a on the basis of the topology information.

Subsequently, the training data generation unit 4 specifies the amount of packet loss outside the communication section K in the unit time after the lapse of a predetermined period (in this example, after lapse of 20 days) from each of unit times. For example, the amount of packet loss to be associated with the value of each of the second attributes for "15:00 on Oct. 10, 2017" can be specified by using the amount of traffic discarded when the radio relay device 51a receives traffic from the base station at "15:00 on Oct. 30, 2017". In this manner, the training data generation unit 4 generates the training data including the values of the second attributes. FIG. 8 illustrates an example of this training data. However, the training data does not need to include all the attributes illustrated in FIG. 8 as the second attribute, or may include other attributes (for example, "whether it is holiday" obtained from calendar information) as the second attribute. Furthermore, the training data may include an attribute other than the second attribute. However, this training data does not include the first attribute described above.

Furthermore, the example illustrated in FIG. 8 is the case where the "amount of packet loss" after the lapse of the predetermined period is included in the training data. The training data generation unit 4 may include "the presence or absence of occurrence of packet loss" after the lapse of a predetermined period, instead of "the amount of packet loss" after the lapse of a predetermined period. The value can be represented by a numerical value "1" for the case of the presence of occurrence of a packet loss, and the value can be represented by a numerical value "0" for the case of the absence of occurrence of a packet loss. In this case, determination can be the presence of occurrence of a packet loss when there is discarded traffic at the time when the radio relay device 51a receives the traffic from the base station, and determination can be the absence of occurrence of a packet loss when there is no discarded traffic. FIG. 9 illustrates an example of training data including the presence or absence of occurrence of packet loss after the elapse of a predetermined period.

FIGS. 8 and 9 illustrate the training data for generation of the second learning model generated in association with the radio relay device 51*a*. Now, a case of creating training data in association with the radio relay device 51*b* on the downstream side in the traffic flow from the base station to the router will be described. In this case, the training data generation unit 4 can specify the amount of packet loss in the unit time after the lapse of the predetermined period by calculating a value obtained by subtracting the amount of traffic received by the router 53 from the radio relay device 51*b* from the amount of traffic transmitted from the radio relay device 51*b* toward the router 53. In a case of specifying the presence or absence of occurrence of packet loss, the training data generation unit 4 can perform similar calculation and determine the presence of occurrence of a packet loss when the subtraction result is positive, and determine the absence of occurrence of a packet loss when the subtraction result is 0. Furthermore, in the setting of the training data for generating the second learning model in the radio relay device 51*b*, for example, the number of networks connected to the router 53 can be used instead of the number of base stations. The number of networks connected to the router 53 can also be obtained from topology information, for example.

Note that the "predetermined period" in the training data for generating the first learning model and the "predetermined period" in the training data for generating the second learning model are the same period. Although this example is an exemplary case where the predetermined period is 20 days, the predetermined period need not be 20 days.

The training data generation unit 4 generates, for each of the radio relay devices 51, training data for generating the first learning model and training data for generating the second learning model.

The first model generation unit 5 uses training data for generating a first learning model and thereby generates a first learning model by machine learning. The training data for generating the first learning model is generated for each of the radio relay devices 51. Accordingly, the first model generation unit 5 generates the first learning model for each of the radio relay devices 51.

The second model generation unit 6 uses training data for generating a second learning model and thereby generates a second learning model by machine learning. The training data for generating the second learning model is generated for each of the radio relay devices 51. Accordingly, the second model generation unit 6 generates the second learning model for each of the radio relay devices 51.

The machine learning algorithm executed by the first model generation unit 5 and the second model generation unit 6 is not particularly limited.

Note that, in a case where the first model generation unit 5 generates a first learning model for predicting the amount of packet loss, the second model generation unit 6 also generates a second learning model for predicting the amount of packet loss. In this case, the training data generation unit 4 can generate the training data illustrated in FIG. 6 as the training data for generating the first learning model, and can generate the training data as illustrated in FIG. 8 as the training data for generating the second learning model. In this case, the learning model is obtained as a regression equation, for example.

In a case where the first model generation unit 5 generates a first learning model for predicting the presence or absence of occurrence of packet loss, the second model generation unit 6 also generates a second learning model for predicting the presence or absence of occurrence of packet loss. In this case, the training data generation unit 4 can generate the training data illustrated in FIG. 7 as the training data for generating the first learning model, and can generate the training data as illustrated in FIG. 9 as the training data for generating the second learning model. In this case, the learning model is obtained as a discriminant, for example.

Regardless of the type of the first learning model, namely, whether it is a regression equation or a discriminant, the first learning model can be represented by the following Equation (1), for example.

$$y = a_1 x_1 + a_2 x_2 + \ldots + a_n x_n + b \quad (1)$$

$x_1$ to $x_n$ are explanatory variables corresponding to various first attributes included in the training data, while $a_1$ to $a_n$ are coefficients of individual explanatory variables, respectively. b is a constant term.

y is an objective variable.

In a case where Equation (1) is a regression equation for predicting the amount of packet loss, y represents the amount of predicted packet loss. Note that this packet loss amount is a predicted value of the amount of packet loss in the communication section K.

In a case where Equation (1) is a discriminant for predicting the presence or absence of occurrence of packet loss, y takes a value in a range of 0 to 1. The closer the value y is to 1, the higher the possibility of occurrence of packet loss in the communication section K, and the closer the value y is to 0, the lower the possibility of occurrence of packet loss in the communication section K.

Regardless of the type of the second learning model, namely, whether it is a regression equation or a discriminant, the second learning model can be represented by the following Equation (2), for example.

$$Y = A_1 X_1 + A_2 X_2 + \ldots + A_m X_m + B \quad (2)$$

$X_1$ to $X_m$ are explanatory variables corresponding to various second attributes included in the training data, while $A_1$ to $A_m$ are coefficients of individual explanatory variables, respectively. B is a constant term.

Y is an objective variable.

In a case where Equation (2) is a regression equation for predicting the amount of packet loss, Y represents the amount of predicted packet loss. Note that this amount of packet loss is a predicted value of the amount of packet loss outside the communication section K (for example, the communication section on the base station 52 side when viewed from the radio relay device 51*a*).

In a case where Equation (2) is a discriminant for predicting the presence or absence of occurrence of packet loss, Y takes a value in a range of 0 to 1. The closer the value y is to 1, the higher the possibility of occurrence of packet loss outside the communication section K, and the closer the value Y is to 0, the lower the possibility of occurrence of packet loss outside the communication section K.

The first model generation unit 5 causes the model storage unit 7 to store the generated first learning model. Similarly, the second model generation unit 6 causes the model storage unit 7 to store the generated second learning model.

The model storage unit 7 is a storage device that stores the first learning model generated by the first model generation unit 5 and the second learning model generated by the second model generation unit 6.

Although the present exemplary embodiment is the case where the first learning model is expressed in the form of Equation (1) and the second learning model is expressed in the form of Equation (2), the formats of the first and second learning models are not limited to the formats illustrated in Equations (1) and (2), respectively.

The first prediction unit 8 makes a prediction regarding future packet loss in the communication section K by using the first learning model. Hereinafter, a future unit time as a target for the prediction regarding packet loss is referred to as prediction target time.

It is assumed here that the first learning model (Equation (1)) is a regression equation for predicting the amount of packet loss. In this case, the first prediction unit 8 reads values of the attributes corresponding to the explanatory variables of Equation (1) at a time a predetermined period before the prediction target time, from the data storage unit 3, assigns the values of the attributes to the explanatory variables, and then, obtains the value y by the calculation of Equation (1). This value y is a predicted value of the amount of packet loss in the communication section K at the future prediction target time.

It is assumed here that the first learning model (Equation (1)) is a discriminant for predicting the presence or absence of occurrence of packet loss. In this case also, the first prediction unit 8 reads values of the attributes corresponding to the explanatory variables of Equation (1) at a time a predetermined period before the prediction target time, from the data storage unit 3, assigns the values of the attributes to the explanatory variables, and then, obtains the value y by the calculation of Equation (1). In a case where Equation (1) is a discriminant, y takes a value in the range of 0 to 1. For example, the first prediction unit 8 replaces the value y with 1 when the value y is 0.5 or more, and replaces the value y with 0 when the value y is less than 0.5. A result that the value y is 1 indicates a prediction that packet loss will occur in the communication section K at the future prediction target time. Furthermore, a result that the value y is 0 indicates a prediction that no packet loss will occur in the communication section K at the future prediction target time.

Using the second learning model, the second prediction unit 9 makes a prediction regarding packet loss outside the future communication section K (for example, the communication section on the base station 52 side as viewed from the radio relay device 51a in the case of making prediction in the radio relay device 51a).

It is assumed here that the second learning model (Equation (2)) is a regression equation for predicting the amount of packet loss. In this case, the second prediction unit 9 reads values of the attributes corresponding to the explanatory variables of Equation (2) at a time a predetermined period before the prediction target time, from the data storage unit 3, assigns the values of the attributes to the explanatory variables, and then, obtains the value Y by the calculation of Equation (2). The value Y is a predicted value of the amount of packet loss outside the communication section K at the future prediction target time.

It is assumed here that the second learning model (Equation (2)) is a discriminant for predicting the presence or absence of occurrence of packet loss. In this case also, the second prediction unit 9 reads values of the attributes corresponding to the explanatory variables of Equation (2) at a time a predetermined period before the prediction target time, from the data storage unit 3, assigns the values of the attributes to the explanatory variables, and then, obtains the value Y by the calculation of Equation (2). In a case where Equation (2) is a discriminant, Y takes a value in the range of 0 to 1. For example, the second prediction unit 9 replaces the value Y with 1 when the value Y is 0.5 or more, and replaces the value Y with 0 when the value y is less than 0.5. A result that the value Y is 1 indicates a prediction that packet loss will occur outside the communication section K at the future prediction target time. Furthermore, a result that the value Y is 0 indicates a prediction that no packet loss will occur outside the communication section K at the future prediction target time.

The first prediction unit 8 and the second prediction unit 9 execute the above-described prediction process for each of the radio relay devices 51.

Note that operation of designating the prediction target time for the first prediction unit 8 and the second prediction unit 9 can be performed by an administrator of the communication quality deterioration prediction system 1. The administrator designates the same unit time, as the prediction target time, for the first prediction unit 8 and the second prediction unit 9. Therefore, the first prediction unit 8 and the second prediction unit 9 makes a prediction regarding packet loss in the same prediction target time. In addition, the administrator may designate, for example, a plurality of continuous spans of unit time as the prediction target time for each of the first prediction unit 8 and the second prediction unit 9. For example, the administrator may designate "15:00 on Oct. 30, 2017", "16:00 on Oct. 30, 2017", . . . as the continuous prediction target times. In this case, each of the first prediction unit 8 and the second prediction unit 9 makes a prediction regarding packet loss for each of the prediction target time. The administrator can designate a future "period corresponding to a unit time" as the prediction target time.

The integration unit 10 integrates the prediction result of the first prediction unit 8 and the prediction result of the second prediction unit 9 that belong to the same prediction target time.

Figure 10:
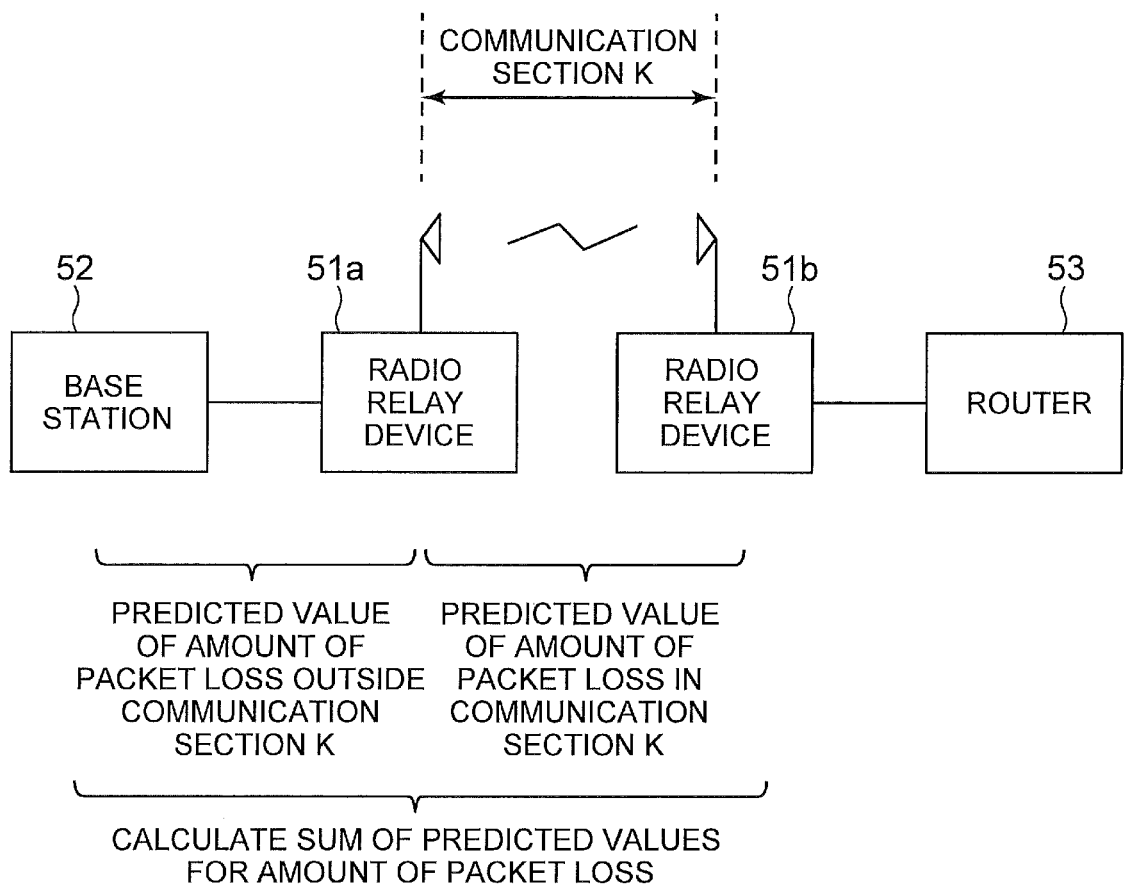

FIG. 10 is a schematic diagram illustrating an example of integrating prediction results in the radio relay device 51a. FIG. 10 is an exemplary case where the first prediction unit 8 and the second prediction unit 9 predict the amount of packet loss. In this case, the integration unit 10 calculates a sum of the prediction result of the first prediction unit 8 (predicted value of the packet loss amount in the communication section K) and the prediction result of the second prediction unit 9 (packet loss amount outside the communication section K). As a result, a predicted value of the total amount of packet loss in the radio relay device 51a is obtained. The integration unit 10 may control to display an integration result (in this example, the predicted value of the total amount of packet loss in the radio relay device 51a) on a display device (not illustrated) provided in the communication quality deterioration prediction system 1, for example. The integration unit 10 controls to display the integration result for each of the radio relay devices 51.

Figure 11:
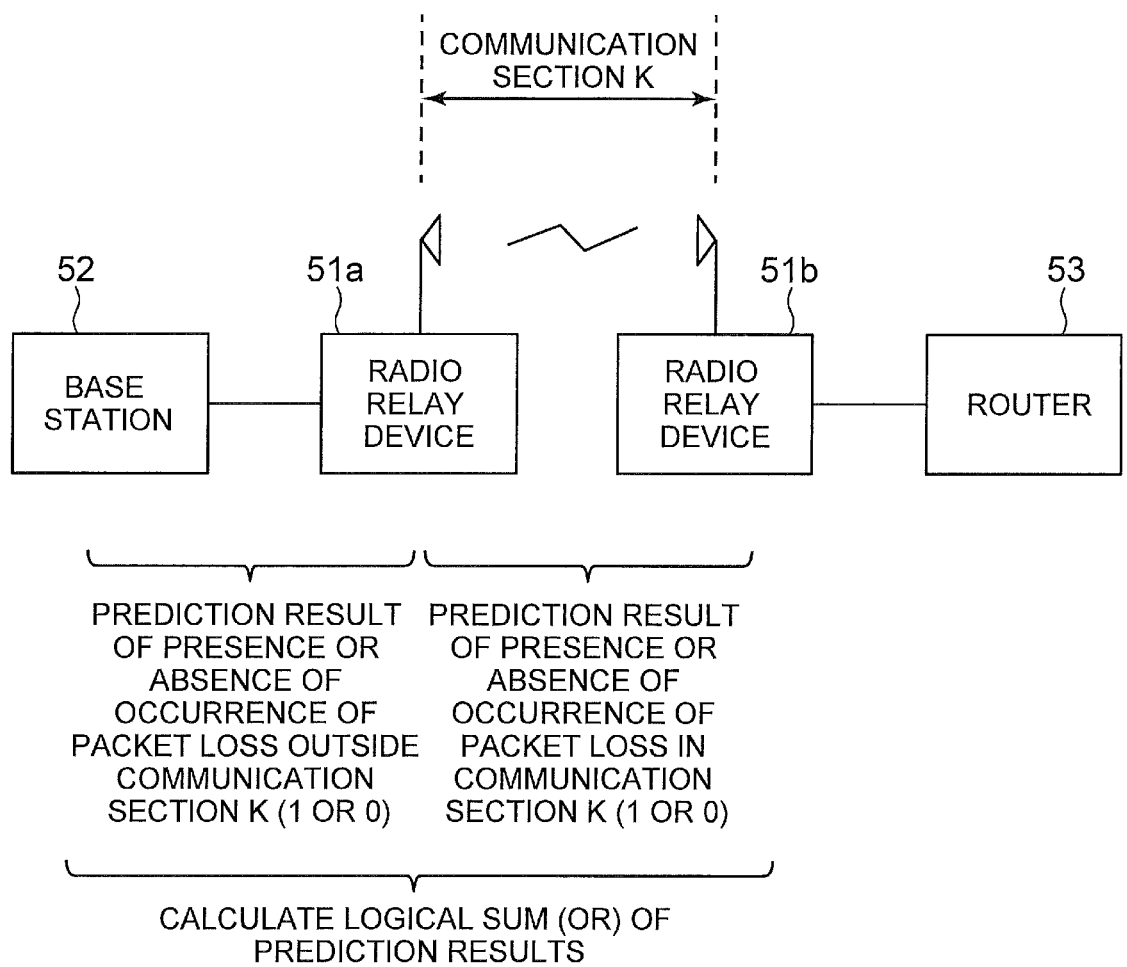

FIG. 11 is a schematic diagram illustrating another example of integrating prediction results in the radio relay device 51a. FIG. 11 illustrates an example in which the first prediction unit 8 and the second prediction unit 9 predict the presence or absence of occurrence of packet loss. In this case, the integration unit 10 calculates the logical sum (OR) of the prediction result of the first prediction unit 8 (prediction result of the presence or absence of occurrence of packet loss in the communication section K, represented by 1 or 0) and the prediction result of the second prediction unit 9 (prediction result of the presence or absence of occurrence of packet loss outside the communication section K, represented by 1 or 0). That is, when at least one of the prediction result of the first prediction unit 8 or the prediction result of the second prediction unit 9 is "1 (occurrence of packet loss)", the integration unit 10 calculates "1" as the logical sum. This indicates a prediction result that packet loss will occur in the radio relay device 51a. In addition, when both the prediction result of the first prediction unit 8 and the prediction result of the second prediction unit 9 are "0 (no occurrence of packet loss)", the integration unit 10 calculates "0" as the logical sum. This indicates a prediction result that no packet loss will occur in the radio relay device 51*a*. The integration unit 10 may display an integration result (in this example, whether the packet loss will occur in the radio relay device Ma) on a display device (not illustrated) provided in the communication quality deterioration prediction system 1, for example. The integration unit 10 controls to display the integration result for each of the radio relay devices 51.

In a case where one or both of the first prediction unit 8 and the second prediction unit 9 predict that packet loss will occur, the integration unit 10 can determine that packet loss will occur in the radio relay device 51*a*. In addition, when both the first prediction unit 8 and the second prediction unit 9 predict that no packet loss will occur, the integration unit 10 can determine that no packet loss occurs in the radio relay device 51*a*.

The integration unit 10 executes the above-described integration process for each of the radio relay devices 51.

In a case where a plurality of consecutive prediction target times are designated, the integration unit 10 executes the above-described integration process for each of the prediction target times. At this time, the integration unit 10 may determine, for example, whether there is a period in which the packet loss occurs for five consecutive hours or more in the radio relay device 51*a*. Furthermore, the integration unit 10 may define the order of the radio relay devices 51 in descending order of the packet loss amount on the prediction target time.

The data receiving unit 2 is implemented by: a central processing unit (CPU) of a computer that operates in accordance with a communication quality deterioration prediction program; and a communication interface of the computer. For example, it is sufficient to have a configuration in which the CPU reads the communication quality deterioration prediction program from a program recording medium such as a program storage device of a computer, thereby allowing the CPU to operate as the data receiving unit 2 using the communication interface in accordance with the program. Furthermore, the training data generation unit 4, the first model generation unit 5, the second model generation unit 6, the first prediction unit 8, the second prediction unit 9, and the integration unit 10 are also implemented by the above-described CPU of the computer that operates in accordance with the communication quality deterioration prediction program. That is, as described above, it is sufficient to allow the CPU, after having read the communication quality deterioration prediction program, to operate as the training data generation unit 4, the first model generation unit 5, the second model generation unit 6, the first prediction unit 8, and the second prediction unit 9, and the integration unit 10. In addition, it is also allowable to use a separate hardware device to individually implement each of the data receiving unit 2, the training data generation unit 4, the first model generation unit 5, the second model generation unit 6, the first prediction unit 8, the second prediction unit 9, and the integration unit 10.

Furthermore, the communication quality deterioration prediction system 1 may have a configuration in which two or more physically separated devices are connected by wire or wirelessly.

Figure 12:
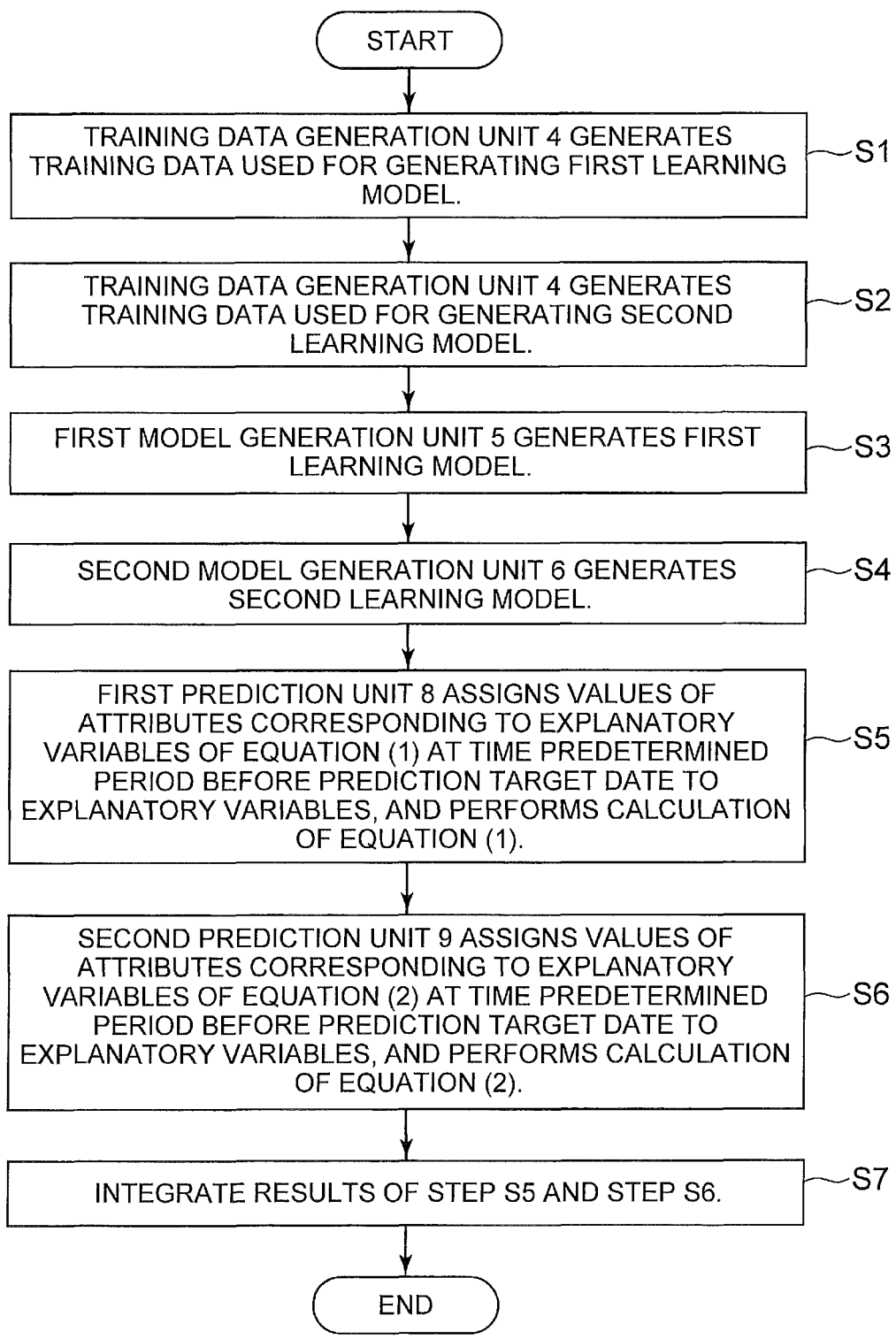
FIG. 12 It depicts a flowchart illustrating an example of processing progress of the communication quality deterioration prediction system of the first exemplary embodiment.

Next, an example of processing progress of the communication quality deterioration prediction system 1 will be described. FIG. 12 is a flowchart illustrating an example of processing progress of the communication quality deterioration prediction system 1 of the first exemplary embodiment. Note that detailed description of the items already described is omitted. Furthermore, the description will be made on the assumption that various types of data are already stored in the data storage unit 3. In addition, it is assumed that the administrator has preliminarily designated the prediction target time for the first prediction unit 8 and the second prediction unit 9.

The communication quality deterioration prediction system 1 executes the following steps S1 to S7 for each of the radio relay devices 51.

First, the training data generation unit 4 generates training data used for generating the first learning model (step S1). In a case where the communication quality deterioration prediction system 1 predicts the amount of packet loss, the training data generation unit 4 generates the training data illustrated in FIG. 6. In a case where the communication quality deterioration prediction system 1 predicts the presence or absence of occurrence of packet loss, the training data generation unit 4 generates the training data illustrated in FIG. 7.

Next, the training data generation unit 4 generates training data used for generating the second learning model (step S2). In a case where the communication quality deterioration prediction system 1 predicts the amount of packet loss, the training data generation unit 4 generates training data illustrated in FIG. 8. In a case where the communication quality deterioration prediction system 1 predicts the presence or absence of occurrence of packet loss, the training data generation unit 4 generates the training data illustrated in FIG. 9.

Next, the first model generation unit 5 generates (step S3) a first learning model represented by Equation (1), for example, by machine learning using the training data generated in step S1. In a case where the communication quality deterioration prediction system 1 predicts the amount of packet loss, y in Equation (1) represents a predicted value of the amount of packet loss in the communication section K. In a case where the communication quality deterioration prediction system 1 predicts the presence or absence of occurrence of packet loss, y in Equation (1) represents the possibility of occurrence of packet loss in the communication section K. The first model generation unit 5 causes the model storage unit 7 to store the generated first learning model.

Next, the second model generation unit 6 generates (step S4) a second learning model represented by Equation (2), for example, by machine learning using the training data generated in step S2. In a case where the communication quality deterioration prediction system 1 predicts the amount of packet loss, Y in Equation (2) represents a predicted value of the amount of packet loss outside the communication section K. In a case where the communication quality deterioration prediction system 1 predicts the presence or absence of occurrence of packet loss, Y in Equation (2) represents the possibility of occurrence of packet loss outside the communication section K. The second model generation unit 6 causes the model storage unit 7 to store the generated second learning model.

Next, the first prediction unit 8 reads values of the attributes corresponding to the explanatory variables of Equation (1) at a time a predetermined period before the prediction target time, from the data storage unit 3, assigns the values of the attributes to the explanatory variables, and then, calculates the Equation (1) (step S5). In a case where the communication quality deterioration prediction system 1 predicts the amount of packet loss, a predicted value of the amount of packet loss in the communication section K will be obtained as a calculation result. In a case where the communication quality deterioration prediction system 1 predicts the presence or absence of occurrence of packet loss, the first prediction unit 8 replaces the value y with 1 when the calculation result of y is 0.5 or more, or replaces the value y with 0 when the calculation result of y is less than 0.5. "1" after replacement indicates a prediction result that packet loss will occur in the communication section K, and "0" after replacement indicates a prediction result that no packet loss will occur in the communication section K.

Next, the second prediction unit 9 reads values of the attributes corresponding to the explanatory variables of Equation (2) at a time a predetermined period before the prediction target time, from the data storage unit 3, assigns the values of the attributes to the explanatory variables, and then, calculates the Equation (2) (step S6). In a case where the communication quality deterioration prediction system 1 predicts the amount of packet loss, a predicted value of the amount of packet loss outside the communication section K will be obtained as a calculation result. In a case where the communication quality deterioration prediction system 1 predicts the presence or absence of occurrence of packet loss, the second prediction unit 9 replaces the value Y with 1 when the calculation result of Y is 0.5 or more, or replaces the value Y with 0 when the calculation result of Y is less than 0.5. The number "1" after replacement indicates a prediction result that packet loss will occur outside the communication section K, while "0" after replacement indicates a prediction result that no packet loss will occur outside the communication section K.

Next, the integration unit 10 integrates (step S7) the result of step S5 and the result of step S6. In a case where the communication quality deterioration prediction system 1 predicts the amount of packet loss, the integration unit 10 calculates a sum of the predicted value of the amount of packet loss in the communication section K calculated in step S5 and the predicted value of the amount of packet loss outside the communication section K calculated in step S6. In a case where the communication quality deterioration prediction system 1 predicts the presence or absence of occurrence of packet loss, the integration unit 10 calculates a logical sum (OR) of the result (1 or 0) of step S5 and the result (1 or 0) of step S6. Acquisition of "1" by the logical sum indicates that packet loss is predicted to occur in the radio relay device 51 of interest, and acquisition of "0" by the logical sum indicates that it is predicted that no packet loss will occur in the radio relay device 51 of interest.

According to the present exemplary embodiment, the first model generation unit 5 generates the first learning model for making predictions regarding the packet loss in the communication section K on the basis of the training data including the values of the attributes (first attributes) related to a cause of the packet loss in the communication section K.

Accordingly, it is possible, with the first learning model, to make a prediction regarding packet loss in the communication section K with high accuracy. Moreover, the second model generation unit 6 generates the second learning model for making predictions regarding the packet loss outside the communication section K on the basis of the training data including the values of the attributes (second attributes) related to a cause of the packet loss outside the communication section K. Accordingly, it is possible, with the second learning model, to make a prediction regarding packet loss outside the communication section K with high accuracy.

Consequently, it is also possible to obtain with high accuracy the prediction result regarding the packet loss in one radio relay device 51 obtained by integrating the prediction result regarding the packet loss in the communication section K and the prediction result regarding the packet loss outside the communication section K.

Next, a modification of the first exemplary embodiment will be described. Regarding the training data used for generating the first learning model, the training data generation unit 4 may generate the training data including "link down time of the communication section K after the lapse of a predetermined period" instead of including "the amount of packet loss after the lapse of a predetermined period (refer to FIG. 6)" or "the presence or absence of occurrence of packet loss after the lapse of a predetermined period (refer to FIG. 7)".

In addition, the first model generation unit 5 may generate a learning model (Equation (1)) that uses the "link down time of the communication section K after the lapse of a predetermined period" as the objective variable y.

In this case, it is allowable to use a configuration in which the first prediction unit 8 reads values of the attributes corresponding to the explanatory variables of Equation (1) at a time a predetermined period before the prediction target time, from the data storage unit 3, assigns the values of the attributes to the explanatory variables, and then, performs calculation of Equation (1). As a result of this calculation, it is possible to obtain a predicted value of the link down time of the communication section K at the prediction target time. When the predicted value of the link down time is 0, this indicates that no packet loss will occur. When the predicted value of the link down time is larger than 0, this indicates that packet loss will occur.

Furthermore, a predicted value of the amount of packet loss can be calculated from the predicted value of the link down time. In a case where the first prediction unit 8 calculates the predicted value of the amount of packet loss, it is sufficient to allow the first prediction unit 8 to multiply the predicted value of the link down time by a theoretical maximum bandwidth in the communication section K. The result of the multiplication can be defined as the packet loss amount in the communication section K. This similarly applies in a second exemplary embodiment described below.

Second Exemplary Embodiment

In a second exemplary embodiment of the present invention, the explanatory variables of the first learning model and the second learning model include the explanatory variables corresponding to the traffic amount of the radio relay device 51 at the prediction target time. Before making the prediction with the first learning model and the second learning model, the communication quality deterioration prediction system of the first exemplary embodiment predicts the traffic amount of the radio relay device 51 at the prediction target time and assigns the predicted value of the traffic amount to an explanatory variable included in each of the first learning model and the second learning model.

Figure 13:
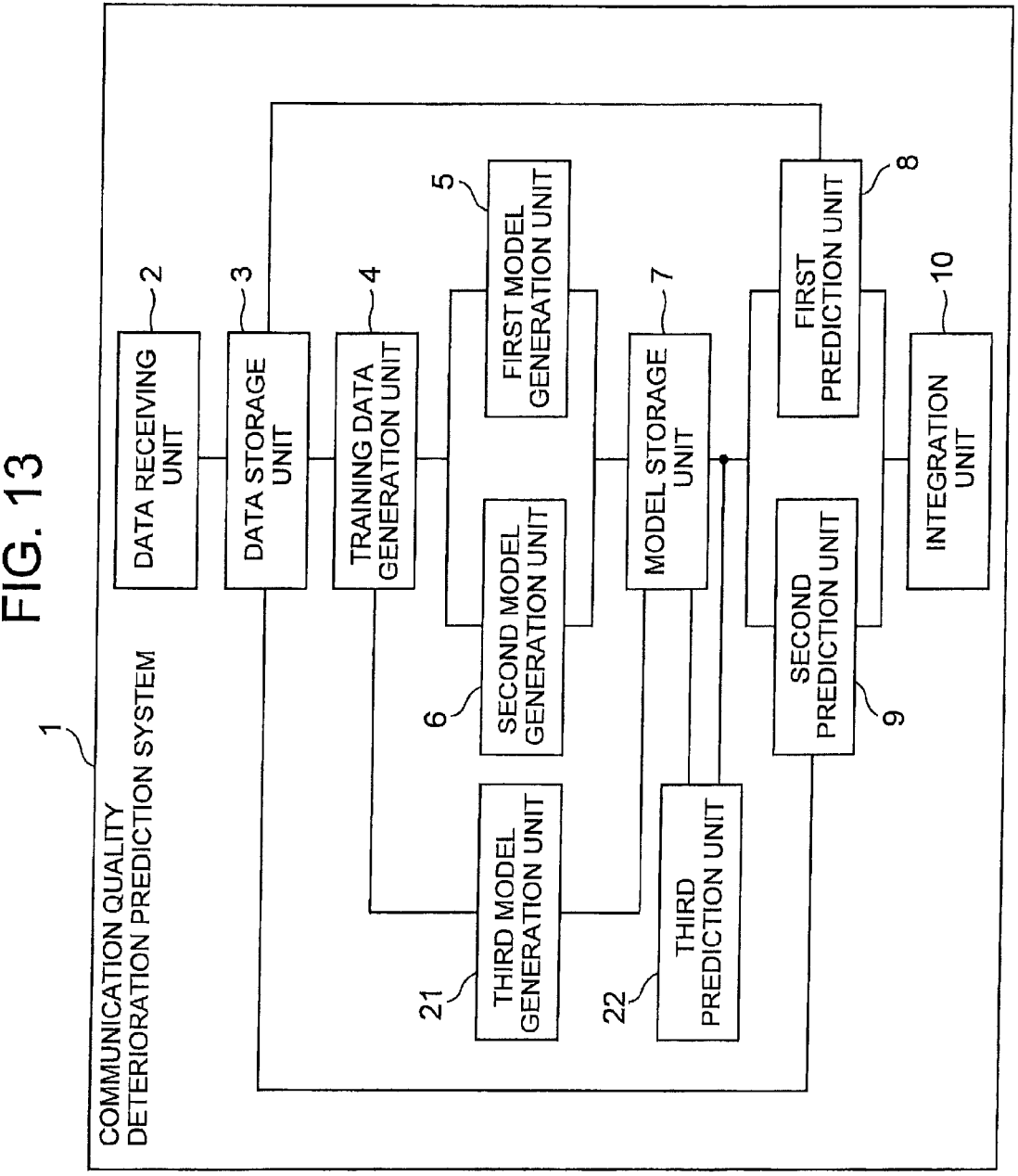
FIG. 13 It depicts a block diagram illustrating an example of a communication quality deterioration prediction system according to a second exemplary embodiment of the present invention.

FIG. 13 is a block diagram illustrating an example of a communication quality deterioration prediction system according to the second exemplary embodiment of the present invention. The same reference numerals as used in FIG. 2 will be given to the components similar to the components in the first exemplary embodiment and descriptions thereof will be omitted as appropriate. In addition to the elements included in the communication quality deterioration prediction system 1 according to the first exemplary embodiment, the communication quality deterioration prediction system 1 according to the second exemplary embodiment further includes a third model generation unit 21 and a third prediction unit 22.

In the second exemplary embodiment, the training data generation unit 4 generates training data by including, as an attribute value, the traffic amount passing through the radio relay device 51 in a unit time after the lapse of a predetermined period from the unit time at which values of the first attributes are obtained, to the training data for generating the first learning model, in addition to the values of the first attributes. FIGS. 14 and 15 illustrate examples of the training data obtained in this manner. FIG. 14 schematically illustrates the training data obtained by adding, to the training data illustrated in FIG. 6, as an attribute value, the traffic amount passing through the radio relay device 51a in a unit time after the lapse of a predetermined period from the unit time at which the values of the first attributes are obtained. FIG. 15 schematically illustrates training data in a case where "the presence or absence of occurrence of packet loss after the lapse of a predetermined period" is included instead of "the amount of packet loss after the lapse of a predetermined period" in FIG. 14.

Similarly, in the second exemplary embodiment, the training data generation unit 4 generates training data by including, as an attribute value, the traffic amount passing through the radio relay device 51 in a unit time after the lapse of a predetermined period from the unit time at which values of the second attributes are obtained, to the training data for generating the second learning model, in addition to the values of the second attributes. FIGS. 16 and 17 illustrate examples of training data obtained in this manner. FIG. 16 schematically illustrates the training data obtained by adding, to the training data illustrated in FIG. 8, as an attribute value, the traffic amount passing through the radio relay device 51a in a unit time after the lapse of a predetermined period from the unit time at which the values of the second attributes are obtained. FIG. 17 schematically illustrates training data in a case where "the presence or absence of occurrence of packet loss after the lapse of a predetermined period" is included instead of "the amount of packet loss after the lapse of a predetermined period" in FIG. 16.

In the second exemplary embodiment, the third model generation unit 21 also generates a learning model for predicting the traffic amount after the lapse of a predetermined period. This learning model is referred to as a third learning model. The third learning model can also be referred to as a traffic amount prediction learning model. The third model generation unit 21 can also be referred to as a traffic amount prediction learning model generation unit.

The training data generation unit 4 also generates training data used for generating the third learning model. The training data generation unit 4 includes, in the training data, the traffic amount of a unit time after the lapse of a predetermined period from a unit time indicated by the time included in the training data. The training data generation unit 4 may include both the values of the first attributes and the values of the second attributes as the attribute values in the training data. FIG. 18 is a schematic diagram illustrating an example of training data used to generate a third learning model.

Note that the "predetermined period" in the training data for generating the first learning model, the "predetermined period" in the training data for generating the second learning model, and the "predetermined period" in the third learning model are the same period.

The training data generation unit 4 generates, for each of the radio relay devices 51, training data for generating the first learning model, training data for generating the second learning model, and training data for generating the third learning model (traffic amount prediction learning model).

The first model generation unit 5 generates the first learning model by using training data for generating the first learning model (refer to FIG. 14 or 15). The first learning model can be expressed in the form of Equation (1). Note that, in the second exemplary embodiment, the first learning model includes an explanatory variable corresponding to the attribute "the traffic amount after a predetermined period". The first model generation unit 5 generates the first learning model for each of the radio relay devices 51.

The second model generation unit 6 generates the second learning model using training data for generating a second learning model (refer to FIG. 16 or 17). The second learning model can be expressed in the form of Equation (2). Note that, in the second exemplary embodiment, the second learning model includes an explanatory variable corresponding to the attribute "the traffic amount after a predetermined period". The second model generation unit 6 generates the second learning model for each of the radio relay devices 51.

The third model generation unit 21 generates the third learning model using training data (refer to FIG. 18) for generating a third learning model. The third learning model is represented by a regression equation, which can be expressed by the following equation (3), for example.

$$y' = a_1'x_1' + a_2'x_2' + \ldots + a_k'x_k' + b' \qquad (3)$$

$x_1'$ to $x_k''$ are explanatory variables corresponding to various attributes included in the training data, while $a_1'$ to $a_k'$ are coefficients of individual explanatory variables, respectively. $b'$ is a constant term.

$y'$ is an objective variable, and represents the traffic amount after the lapse of a predicted predetermined period.

The third model generation unit 21 generates a third learning model for each of the radio relay devices 51, and causes the model storage unit 7 to store each of the generated third learning models.

The third model generation unit 21 can also be referred to as a traffic amount prediction unit.

In the second exemplary embodiment, the first learning model and the second learning model include explanatory variables corresponding to the attribute "the traffic amount after a predetermined period". That is, in a case where the first learning model and the second learning model makes a prediction regarding packet loss at the prediction target time in the second exemplary embodiment, there is a need to obtain the value of the traffic amount at the prediction target time. However, since the prediction target time is in the future, the value of the traffic amount at the prediction target time is not stored in the data storage unit 3. To handle this, in the present exemplary embodiment, the third prediction unit 22 calculates the predicted value of the traffic amount at the prediction target time using the third learning model. The third prediction unit 22 calculates, for each of the radio relay devices 51, a predicted value of the traffic amount at the prediction target time.

Thereafter, the first prediction unit 8 assigns the traffic amount at the prediction target time calculated by the third prediction unit 22, in addition to the values of the first attributes, to the explanatory variable in the first learning model, and thereby makes a prediction regarding the packet loss at the prediction target time.

Similarly, the second prediction unit 9 assigns the traffic amount at the prediction target time calculated by the third prediction unit 22, in addition to the values of the second attributes, to the explanatory variable in the second learning model, and thereby makes a prediction regarding the packet loss at the prediction target time.

The other points are similar to the first exemplary embodiment.

The third model generation unit 21 and the third prediction unit 22 are implemented by a CPU of a computer that operates in accordance with a communication quality deterioration prediction program, for example.

Figure 19:
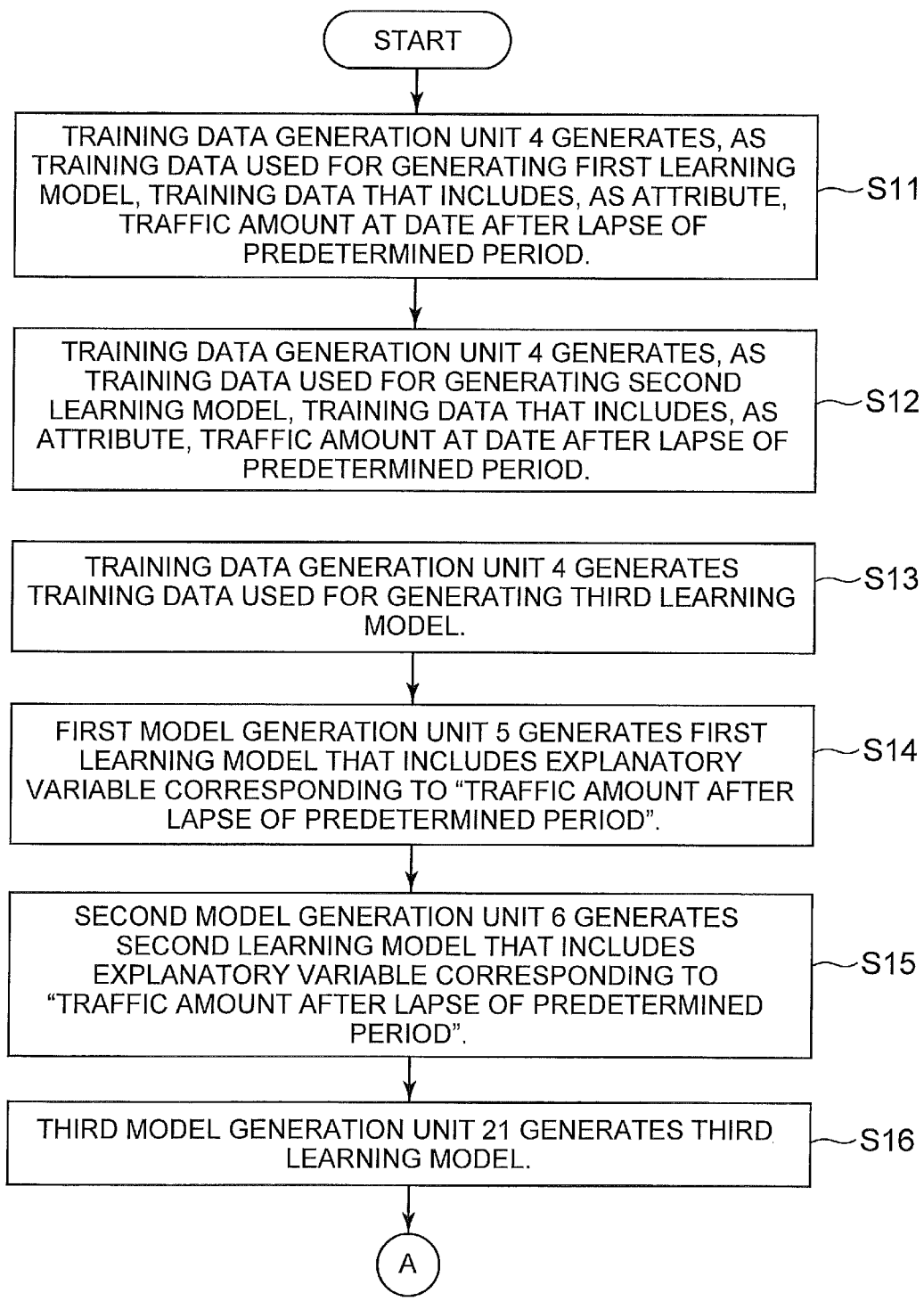
FIG. 19 It depicts a flowchart illustrating an example of processing progress of the communication quality deterioration prediction system of the second exemplary embodiment.
Figure 20:
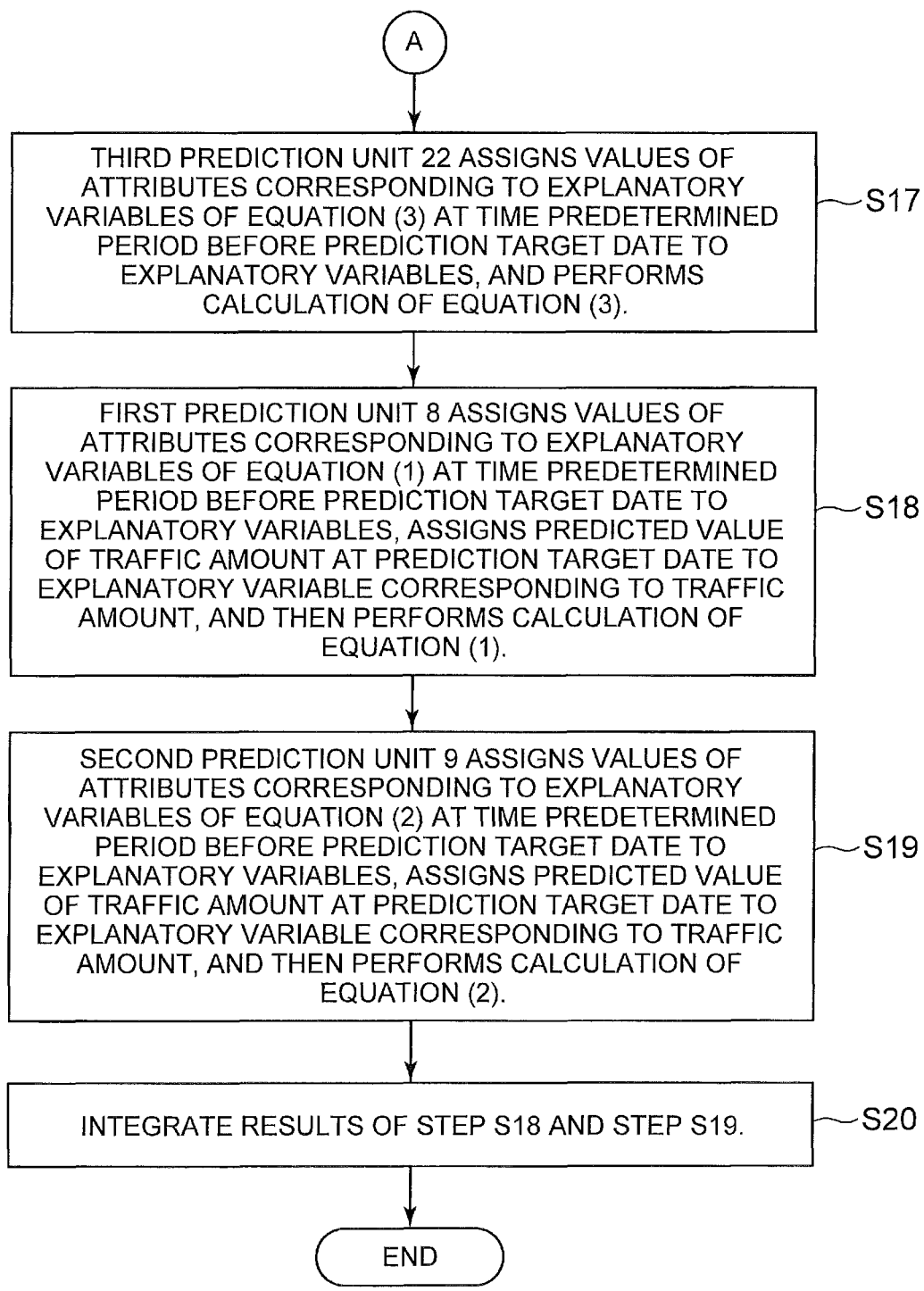
FIG. 20 It depicts a flowchart illustrating an example of processing progress of the communication quality deterioration prediction system according to the second exemplary embodiment.

FIG. 19 and FIG. 20 are flowcharts illustrating an example of processing progress of the communication quality deterioration prediction system 1 according to the second exemplary embodiment. Furthermore, the description will be made on the assumption that various types of data are already stored in the data storage unit 3. In addition, it is assumed that the administrator has preliminarily designated the prediction target time for the first prediction unit 8, the second prediction unit 9, and the third prediction unit 22.

The communication quality deterioration prediction system 1 executes the following steps S11 to S20 for each of the radio relay devices 51.

First, the training data generation unit 4 generates, as training data used for generating the first learning model, training data that includes, as an attribute, the traffic amount in a unit time after the lapse of a predetermined period from the unit time in which the values of the first attributes are obtained (step S11). In a case where the communication quality deterioration prediction system 1 predicts the amount of packet loss, the training data generation unit 4 generates the training data illustrated in FIG. 14. In a case where the communication quality deterioration prediction system 1 predicts the presence or absence of occurrence of packet loss, the training data generation unit 4 generates the training data illustrated in FIG. 15.

Next, the training data generation unit 4 generates, as training data used for generating the second learning model, training data that includes, as an attribute, the traffic amount in a unit time after the lapse of a predetermined period from the unit time in which the values of the second attributes are obtained (step S12). In a case where the communication quality deterioration prediction system 1 predicts the amount of packet loss, the training data generation unit 4 generates the training data illustrated in FIG. 16. In a case where the communication quality deterioration prediction system 1 predicts the presence or absence of occurrence of packet loss, the training data generation unit 4 generates the training data illustrated in FIG. 17.

Next, the training data generation unit 4 generates training data used for generating the third learning model (step S13). For example, the training data generation unit 4 generates the training data illustrated in FIG. 18.

Next, the first model generation unit 5 generates a first learning model (step S14) represented by Equation (1), for example, by machine learning using the training data generated in step S11. At this time, the first model generation unit 5 generates the first learning model that includes an explanatory variable that corresponds to "the traffic amount after a predetermined period". In a case where the communication quality deterioration prediction system 1 predicts the amount of packet loss, y in Equation (1) represents a predicted value of the amount of packet loss in the communication section K. In a case where the communication quality deterioration prediction system 1 predicts the presence or absence of occurrence of packet loss, y in Equation (1) represents the possibility of occurrence of packet loss in the communication section K. The first model generation unit 5 causes the model storage unit 7 to store the generated first learning model.

Next, the second model generation unit 6 generates a second learning model (step S15) represented by Equation (2), for example, by machine learning using the training data generated in step S12. At this time, the second model generation unit 6 generates the second learning model that includes an explanatory variable corresponding to "the traffic amount after a predetermined period". In a case where the communication quality deterioration prediction system 1 predicts the amount of packet loss, Y in Equation (2) represents a predicted value of the amount of packet loss outside the communication section K. In a case where the communication quality deterioration prediction system 1 predicts the presence or absence of occurrence of packet loss, Y in Equation (2) represents the possibility of occurrence of packet loss outside the communication section K. The second model generation unit 6 causes the model storage unit 7 to store the generated second learning model.

Next, the third model generation unit 21 generates a third learning model (S16) represented by Equation (3), for example, by machine learning using the training data generated in step S13. The third model generation unit 21 causes the model storage unit 7 to store the generated third learning model.

Next, the third prediction unit 22 reads values of the attributes corresponding to the explanatory variables of Equation (3) at a time a predetermined period before the prediction target time, from the data storage unit 3, assigns the values of the attributes to the explanatory variables, and then, performs calculation of Equation (3) (step S17). This calculation result is a predicted value of the traffic amount at the prediction target time.

Next, the first prediction unit 8 reads the values of the attributes corresponding to the explanatory variables of Equation (1) from the data storage unit 3 at a time a predetermined period before the prediction target time, assigns the values of the attributes to the explanatory variables, and assigns the predicted value of the traffic amount at the prediction target time to the explanatory variable corresponding to the traffic amount. Subsequently, the first prediction unit 8 performs the calculation of Equation (1) (step S18). In a case where the communication quality deterioration prediction system 1 predicts the amount of packet loss, a predicted value of the amount of packet loss in the communication section K will be obtained as a calculation result. In a case where the communication quality deterioration prediction system 1 predicts the presence or absence of occurrence of packet loss, the first prediction unit 8 replaces the value y with 1 when the calculation result of y is 0.5 or more, or replaces the value y with 0 when the calculation result of y is less than 0.5. "1" after replacement indicates a prediction result that packet loss will occur in the communication section K, and "0" after replacement indicates a prediction result that no packet loss will occur in the communication section K.

Next, the second prediction unit 9 reads the values of the attributes corresponding to the explanatory variables of Equation (2) from the data storage unit 3 at a time a predetermined period before the prediction target time, assigns the values of the attributes to the explanatory variables, and assigns the predicted value of the traffic amount at the prediction target time to the explanatory variable corresponding to the traffic amount. Subsequently, the second prediction unit 9 performs the calculation of Equation (2) (step S19). In a case where the communication quality deterioration prediction system 1 predicts the amount of packet loss, a predicted value of the amount of packet loss outside the communication section K will be obtained as a calculation result. In a case where the communication quality deterioration prediction system 1 predicts the presence or absence of occurrence of packet loss, the second prediction unit 9 replaces the value Y with 1 when the calculation result of Y is 0.5 or more, or replaces the value Y with 0 when the calculation result of Y is less than 0.5. The number "1" after replacement indicates a prediction result that packet loss will occur outside the communication section K, while "0" after replacement indicates a prediction result that no packet loss will occur outside the communication section K.

The predicted value of the traffic amount at the prediction target time used in steps S18 and S19 is the value obtained in step S17.

Next, the integration unit 10 integrates (step S20) the result of step S18 and the result of step S19. In a case where the communication quality deterioration prediction system 1 predicts the amount of packet loss, the integration unit 10 calculates a sum of the predicted value of the amount of packet loss in the communication section K calculated in step S18 and the predicted value of the amount of packet loss outside the communication section K calculated in step S19. In a case where the communication quality deterioration prediction system 1 predicts the presence or absence of occurrence of packet loss, the integration unit 10 calculates a logical sum (OR) of the result (1 or 0) of step S18 and the result (1 or 0) of step S19. Acquisition of "1" by the logical sum indicates that packet loss is predicted to occur in the radio relay device 51 of interest, and acquisition of "0" by the logical sum indicates that it is predicted that no packet loss will occur in the radio relay device 51 of interest.

In the second exemplary embodiment, the effect similar to the effect in the first exemplary embodiment can be obtained. Furthermore, in the second exemplary embodiment, the prediction regarding the packet loss is performed also by using the predicted value of the traffic amount at the prediction target time (value obtained in step S17). Accordingly, it is possible, in the second exemplary embodiment, to make a prediction regarding packet loss with higher accuracy.

As described above, the communication quality may be represented by an index other than the packet loss.

Furthermore, although each of the above-described exemplary embodiments is an exemplary case in which the paired communication device are radio relay devices, the paired communication devices may be communication devices other than the radio relay devices. For example, the paired communication devices may be optical communication devices. In this case, for example, an increase in the error ratio indicates communication quality deterioration. Moreover, for example, the paired communication devices may be a base station and an Evolved Packet Core (EPC). In this case, for example, a decrease in the session establishment ratio between the base station and the EPC indicates communication quality deterioration. Note that an EPC is a server installed in the center. In a case where the paired communication devices are a base station and an EPC, for example, a communication section between a terminal such as a smartphone and the base station corresponds to the outside of the communication section between the base station and the EPC.

Figure 21:
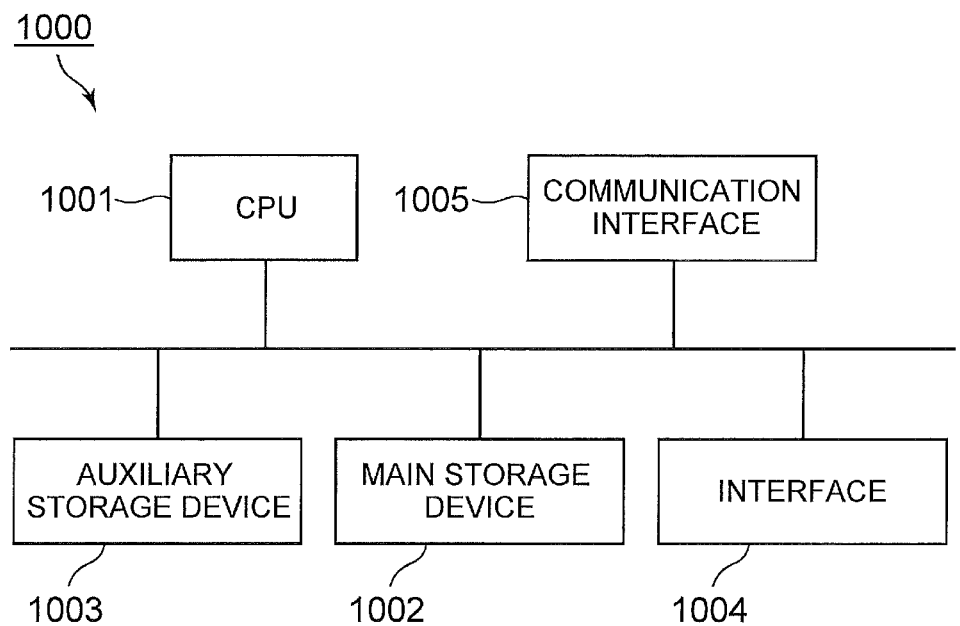
FIG. 21 It depicts a schematic block diagram illustrating a configuration example of a computer according to each of exemplary embodiments of the present invention.

FIG. 21 is a schematic block diagram illustrating a configuration example of a computer according to each of exemplary embodiments of the present invention. A computer 1000 includes a CPU 1001, a main storage device 1002, an auxiliary storage device 1003, an interface 1004, and a communication interface 1005.

The communication quality deterioration prediction system 1 according to each of exemplary embodiments of the present invention is installed in the computer 1000. Operation of the communication quality deterioration prediction system 1 is stored in the auxiliary storage device 1003 in the form of a communication quality deterioration prediction program. The CPU 1001 reads the communication quality deterioration prediction program from the auxiliary storage device 1003, expands the program in the main storage device 1002, and executes the above-described processes in accordance with the communication quality deterioration prediction program.

The auxiliary storage device 1003 is an example of a non-transitory tangible medium. Other examples of the non-transitory tangible storage medium include a magnetic disk, a magneto-optical disk, a compact disc read only memory (CD-ROM), a digital versatile disk read only memory (DVD-ROM), and a semiconductor memory, connected via the interface 1004. In a case where the program is distributed to the computer 1000 via a communication channel, the computer 1000 that has received the program may load the program into the main storage device 1002 and execute the above processing.

Furthermore, the program may be provided for implementing a part of the processes described above. Furthermore, the program may be a difference program that for implementing the above-described processes in combination with another program already stored in the auxiliary storage device 1003.

In addition, a part or all of individual components may be implemented by a general-purpose circuit (circuitry), a dedicated circuit, a processor, or a combination of these components. These may be formed by a single chip or may be formed by a plurality of chips connected via a bus. Some or all of the components may be implemented by a combination of the above-described circuits or the like and a program.

In a case where some or all of the constituent elements are implemented by a plurality of information processing devices and circuits, the plurality of information processing devices and circuits may be centrally arranged or distributed. For example, an information processing device, a circuit, or the like may be implemented as a form in which each of a client and server system, a cloud computing system, or the like is connected via a communication network.

Figure 22:
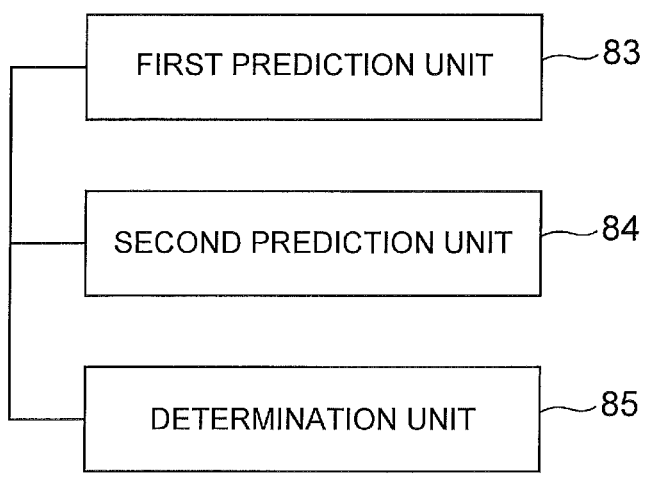
FIG. 22 It depicts a block diagram illustrating an outline of the communication quality deterioration prediction system of the present invention.

Next, a summary of the present invention will be described. FIG. 22 is a block diagram illustrating an outline of a communication quality deterioration prediction system of the present invention. The communication quality deterioration prediction system of the present invention includes a first prediction unit 83, a second prediction unit 84, and a determination unit 85.

The first prediction unit 83 (for example, the first prediction unit 8) predicts the amount of future communication quality deterioration or the presence or absence of occurrence of future communication quality deterioration in a communication section (for example, the communication section K) between one communication device (for example, the radio relay device 51*a*) and another communication device (for example, the radio relay device 51*b*) communicably connected to the one communication device by using the first learning model generated on the basis of the first attributes being attributes related to a cause of communication quality deterioration in the communication section.

The second prediction unit 84 (for example, the second prediction unit 9) predicts the amount of future communication quality deterioration or the presence or absence of occurrence of future communication quality deterioration outside the communication section regarding one communication device by using the second learning model generated on the basis of the second attributes being attributes related to a cause of communication quality deterioration outside the communication section regarding the one communication device.

The determination unit 85 (for example, the integration unit 10) determines the amount of future communication quality deterioration or the presence or absence of occurrence of future communication quality deterioration regarding one communication device on the basis of the prediction result of the first prediction unit and the prediction result of the second prediction unit.

With such a configuration, it is possible to predict with high accuracy the amount of future communication quality deterioration or the presence or absence of occurrence of future communication quality deterioration.

The system may further include: a first learning model generation unit (for example, the first model generation unit 5) that generates the first learning model for predicting the amount of future communication quality deterioration or the presence or absence of occurrence of future communication quality deterioration by using values of the first attributes and the amount of communication quality deterioration or the presence or absence of occurrence of communication quality deterioration in the communication section, as training data; and a second learning model generation unit (for example, the second model generation unit 6) that generates the second learning model for predicting the amount of future communication quality deterioration or the presence or absence of occurrence of future communication quality deterioration by using values of the second attributes and the amount of communication quality deterioration or the presence or absence of occurrence of communication quality deterioration outside the communication section regarding one communication device, as training data.

Furthermore, the system may have a configuration in which the first learning model generation unit generates the first learning model for predicting the amount of future communication quality deterioration by using the values of the first attributes and the amount of communication quality deterioration in the communication section, as training data, the second learning model generation unit generates the second learning model for predicting the amount of future communication quality deterioration by using the values of the second attributes and the amount of communication quality deterioration outside the communication section regarding one communication device, as training data, the first prediction unit 83 predicts the amount of future communication quality deterioration in the communication section, the second prediction unit 84 predicts the amount of future communication quality deterioration outside the communication section regarding the one communication device, and the determination unit 85 obtains a sum of the amount of communication quality deterioration predicted by the first prediction unit and the amount of communication quality deterioration predicted by the second prediction unit as the amount of future communication quality deterioration in the one communication device.

Furthermore, the system may have a configuration in which the first learning model generation unit generates the first learning model for predicting the presence or absence of occurrence of future communication quality deterioration by using the values of the first attributes and the presence or absence of occurrence of communication quality deterioration in the communication section, as training data, the second learning model generation unit generates the second learning model for predicting the presence or absence of occurrence of future communication quality deterioration by using the values of the second attributes and the presence or absence of occurrence of communication quality deterioration outside the communication section regarding one communication device, as training data, the first prediction unit 83 predicts the presence or absence of occurrence of future communication quality deterioration in the communication section, the second prediction unit 84 predicts the presence or absence of occurrence of future communication quality deterioration outside the communication section regarding the one communication device, and the determination unit 85 determines that the communication quality deterioration will occur in the one communication device in a case where one or both of the first prediction unit and the second prediction unit predict that the communication quality deterioration will occur, and determines that no communication quality deterioration will occur in the one communication device in a case where both of the first prediction unit and the second prediction unit predict that no communication quality deterioration will occur.

Furthermore, the system may further include: a traffic amount prediction learning model generation unit (for example, the third model generation unit 21) that generates a traffic amount prediction learning model (for example, the third learning model) for predicting a future traffic amount of one communication device; and a traffic amount prediction unit (for example, the third prediction unit 22) that predicts a future traffic amount of the one communication device by using the traffic amount prediction learning model, and may have a configuration in which the first learning model generation unit generates the first learning model by using training data including a value of the traffic amount of the one communication device, the second learning model generation unit generates the second learning model by using the training data including the value of the traffic amount of the one communication device, the first prediction unit 83 executes prediction using the future traffic amount predicted by the traffic amount prediction unit and using the first learning model, and the second prediction unit 84 executes prediction using the future traffic amount predicted by the traffic amount prediction unit and using the second learning model.

It is allowable to have a configuration in which the first attributes include at least one attribute out of weather information, antenna orientation, size of the antenna, type of the antenna, of the one communication device, frequency, and radio wave conditions, and the second attributes include at least one attribute out of the presence or absence of an event, the presence or absence of a campaign, and demographics of a district in which the one communication device exists.

While the invention of the present application has been described with reference to the exemplary embodiments, the invention of the present application is not limited to the above-described exemplary embodiments. Configuration and details of the invention of the present application can be modified in various manners understandable for those skilled in the art within the scope of the invention of the present application.

INDUSTRIAL APPLICABILITY

The present invention can be suitably applied to a communication quality deterioration prediction system that predicts the amount of future communication quality deterioration or the presence or absence of a communication quality deterioration.

REFERENCE SIGNS LIST

1 Communication quality deterioration prediction system
2 Data receiving unit
3 Data storage unit
4 Training data generation unit
5 First model generation unit
6 Second model generation unit
7 Model storage unit
8 First prediction unit
9 Second prediction unit
10 Integration unit
21 Third model generation unit
22 Third prediction unit

What is claimed is:

1. A communication quality deterioration prediction system comprising:
   a first prediction unit that predicts, by using a first learning model, the amount of future communication quality deterioration or the presence or absence of occurrence of future communication quality deterioration in a communication section between one communication device and another communication device communicably connected to the one communication device, wherein the first learning model is generated based on first attributes that relates to a cause of communication quality deterioration in the communication section;
   a second prediction unit that predicts, by using a second learning model, the amount of future communication quality deterioration or the presence or absence of occurrence of future communication quality deterioration outside the communication section regarding the one communication device, wherein the second learning model is generated based on second attributes that relates to a cause of communication quality deterioration outside the communication section regarding the one communication device; and
   a determination unit that determines the amount of future communication quality deterioration or the presence or absence of occurrence of future communication quality deterioration regarding the one communication device based on a prediction result of the first prediction unit and a prediction result of the second prediction unit.

2. The communication quality deterioration prediction system according to claim 1, further comprising:
   a first learning model generation unit that generates the first learning model for predicting the amount of future communication quality deterioration or the presence or absence of occurrence of future communication quality deterioration by using values of the first attributes and the amount of communication quality deterioration or the presence or absence of occurrence of communication quality deterioration in the communication section, as training data; and
   a second learning model generation unit that generates the second learning model for predicting the amount of future communication quality deterioration or the presence or absence of occurrence of future communication quality deterioration by using values of the second attributes and the amount of communication quality deterioration or the presence or absence of occurrence of communication quality deterioration outside the communication section regarding one communication device, as training data.

3. The communication quality deterioration prediction system according to claim 2,
   wherein the first learning model generation unit generates the first learning model for predicting the amount of future communication quality deterioration by using the values of the first attributes and the amount of communication quality deterioration in the communication section, as training data,
   the second learning model generation unit generates the second learning model for predicting the amount of future communication quality deterioration by using the values of the second attributes and the amount of communication quality deterioration outside the communication section regarding one communication device, as training data,
   the first prediction unit predicts the amount of future communication quality deterioration in the communication section,
   the second prediction unit predicts the amount of future communication quality deterioration outside the communication section regarding the one communication device,
   and
   the determination unit obtains a sum of the amount of communication quality deterioration predicted by the first prediction unit and the amount of communication quality deterioration predicted by the second prediction unit as the amount of future communication quality deterioration regarding the one communication device.

4. The communication quality deterioration prediction system according to claim 2,
   wherein the first learning model generation unit generates the first learning model for predicting the presence or absence of occurrence of future communication quality deterioration by using the values of the first attributes and the presence or absence of occurrence of communication quality deterioration in the communication section, as training data,
   the second learning model generation unit generates the second learning model for predicting the presence or absence of occurrence of future communication quality deterioration by using the values of the second attributes and the presence or absence of occurrence of communication quality deterioration outside the communication section regarding one communication device, as training data,
   the first prediction unit predicts the presence or absence of occurrence of future communication quality deterioration in the communication section,
   the second prediction unit predicts the presence or absence of occurrence of future communication quality deterioration outside the communication section regarding the one communication device,
   and
   the determination unit determines that the communication quality deterioration will occur in the one communication device in a case where one or both of the first prediction unit and the second prediction unit predict that the communication quality deterioration will occur, and
   determines that no communication quality deterioration will occur in the one communication device in a case where both of the first prediction unit and the second prediction unit predict that no communication quality deterioration will occur.

5. The communication quality deterioration prediction system according to claim 2, further comprising:
a traffic amount prediction learning model generation unit that generates a traffic amount prediction learning model for predicting a future traffic amount of one communication device; and
a traffic amount prediction unit that predicts a future traffic amount of the one communication device by using the traffic amount prediction learning model,
wherein the first learning model generation unit generates the first learning model by using training data including a value of the traffic amount of the one communication device,
the second learning model generation unit generates the second learning model by using the training data including the value of the traffic amount of the one communication device,
the first prediction unit executes prediction using the future traffic amount predicted by the traffic amount prediction unit and using the first learning model, and
the second prediction unit executes prediction using the future traffic amount predicted by the traffic amount prediction unit and using the second learning model.

6. The communication quality deterioration prediction system according to claim 1,
wherein the first attributes include at least one attribute out of weather information, orientation of an antenna, size of the antenna, type of the antenna, frequency, and radio wave conditions,
and
the second attributes include at least one attribute out of the presence or absence of an event, the presence or absence of a campaign, and demographics of a district in which the one communication device exists.

7. A communication quality deterioration prediction method comprising:
executing a first prediction process of predicting, by using a first learning model, the amount of future communication quality deterioration or the presence or absence of occurrence of future communication quality deterioration in a communication section between one communication device and another communication device communicably connected to the one communication device, wherein the first learning model is generated based on first attributes that relates to a cause of communication quality deterioration in the communication section;
executing a second prediction process of predicting, by using a second learning model, the amount of future communication quality deterioration or the presence or absence of occurrence of future communication quality deterioration outside the communication section regarding the one communication device, wherein the second learning model is generated based on second attributes that relates to a cause of communication quality deterioration outside the communication section regarding the one communication device; and
determining the amount of future communication quality deterioration or the presence or absence of occurrence of future communication quality deterioration regarding the one communication device based on a prediction result of the first prediction process and a prediction result of the second prediction process.

8. The communication quality deterioration prediction method according to claim 7, further comprising:
generating the first learning model for predicting the amount of future communication quality deterioration or the presence or absence of occurrence of future communication quality deterioration by using values of the first attributes and the amount of communication quality deterioration or the presence or absence of occurrence of communication quality deterioration in the communication section, as training data; and
generating the second learning model for predicting the amount of future communication quality deterioration or the presence or absence of occurrence of future communication quality deterioration by using values of the second attributes and the amount of communication quality deterioration or the presence or absence of occurrence of communication quality deterioration outside the communication section regarding one communication device, as training data.

9. A non-transitory computer-readable recording medium in which a communication quality deterioration prediction program is recorded, the communication quality deterioration prediction program causing a computer to execute processes comprising:
a first prediction process of predicting, by using a first learning model, the amount of future communication quality deterioration or the presence or absence of occurrence of future communication quality deterioration in a communication section between one communication device and another communication device communicably connected to the one communication device, wherein the first learning model is generated based on first attributes that relates to a cause of communication quality deterioration in the communication section;
a second prediction process of predicting, by using a second learning model, the amount of future communication quality deterioration or the presence or absence of occurrence of future communication quality deterioration outside the communication section regarding the one communication device, wherein the second learning model is generated based on second attributes that relates to a cause of communication quality deterioration outside the communication section regarding the one communication device; and
a determination process of determining the amount of future communication quality deterioration or the presence or absence of occurrence of future communication quality deterioration regarding the one communication device based on a prediction result of the first prediction process and a prediction result of the second prediction process.

10. The non-transitory computer-readable recording medium according to claim 9, wherein the communication quality deterioration prediction program causes a computer to execute processes further comprising:
a first learning model generation process of generating the first learning model for predicting the amount of future communication quality deterioration or the presence or absence of occurrence of future communication quality deterioration by using values of the first attributes and the amount of communication quality deterioration or the presence or absence of occurrence of communication quality deterioration in the communication section, as training data; and
a second learning model generation process of generating the second learning model for predicting the amount of future communication quality deterioration or the presence or absence of occurrence of future communication quality deterioration by using values of the second attributes and the amount of communication quality deterioration or the presence or absence of occurrence of communication quality deterioration outside the communication section regarding one communication device, as training data.

* * * * *